United States Patent
Fullerton et al.

(10) Patent No.: US 6,823,022 B1
(45) Date of Patent: Nov. 23, 2004

(54) METHOD FOR MITIGATING EFFECTS OF INTERFERENCE IN IMPULSE RADIO COMMUNICATION

(75) Inventors: Larry W. Fullerton, Brownsboro, AL (US); James L. Richards, Fayetteville, TN (US); Vernon R. Brethour, Owens Cross Roads, AL (US); Mark D. Roberts, Hunstville, AL (US); Mark A. Barnes, Madison, AL (US); Ivan A. Cowie, Madison, AL (US); Donald D. Mondul, Dallas, TX (US)

(73) Assignee: Time Domain Corp., Huntsville, AL (US)

( * ) Notice: Subject to any disclaimer, the term of this patent is extended or adjusted under 35 U.S.C. 154(b) by 777 days.

(21) Appl. No.: 09/587,033

(22) Filed: Jun. 2, 2000

(51) Int. Cl.[7] ............................................. H04B 15/00
(52) U.S. Cl. ........................ 375/285; 375/296; 375/346
(58) Field of Search ................................ 375/130, 144, 375/148, 256, 257, 285, 296, 346, 349

(56) References Cited

U.S. PATENT DOCUMENTS

| | | | |
|---|---|---|---|
| 4,641,317 A | 2/1987 | Fullerton | 375/1 |
| 4,743,906 A | 5/1988 | Fullerton | 342/27 |
| 4,813,057 A | 3/1989 | Fullerton | 375/37 |
| 4,979,186 A | 12/1990 | Fullerton | 375/23 |
| 5,363,108 A | 11/1994 | Fullerton | 342/27 |
| 5,677,927 A | 10/1997 | Fullerton et al. | 375/200 |
| 5,687,169 A | 11/1997 | Fullerton | 370/324 |
| 5,832,035 A | 11/1998 | Fullerton | 375/210 |
| 6,301,306 B1 * | 10/2001 | McDonald et al. | 375/259 |

* cited by examiner

Primary Examiner—Amanda T. Le
(74) Attorney, Agent, or Firm—Law Office of Donald D. Mondul

(57) ABSTRACT

A method for mitigating interference in impulse radio communication conveying a message from a transmitting station to a receiving station. The method comprises the steps of: (a) conveying the message in packets; (b) repeating conveyance of selected packets to make up a repeat package; and (c) conveying the repeat package a plurality of times at a repeat period greater than twice the occurrence period of the interference. The communication may convey a message from a proximate transmitter to a distal receiver, and receive a message by a proximate receiver from a distal transmitter. In such a system, the method comprises the steps of: (a) providing interference indications by the distal receiver to the proximate transmitter; (b) using the interference indications to determine predicted noise periods; and (c) operating the proximate transmitter to convey the message according to at least one of the following: (1) avoiding conveying the message during noise periods; (2) conveying the message at a higher power during noise periods; (3) varying error detection coding in the message during noise periods; (4) retransmitting the message following noise periods; (5) avoiding conveying the message when interference is greater than a first strength; (6) conveying the message at a higher power when the interference is greater than a second strength; (7) varying error detection coding in the message when the interference is greater than a third strength; and (8) retransmitting a portion of the message after interference has subsided to less than a predetermined strength.

33 Claims, 16 Drawing Sheets

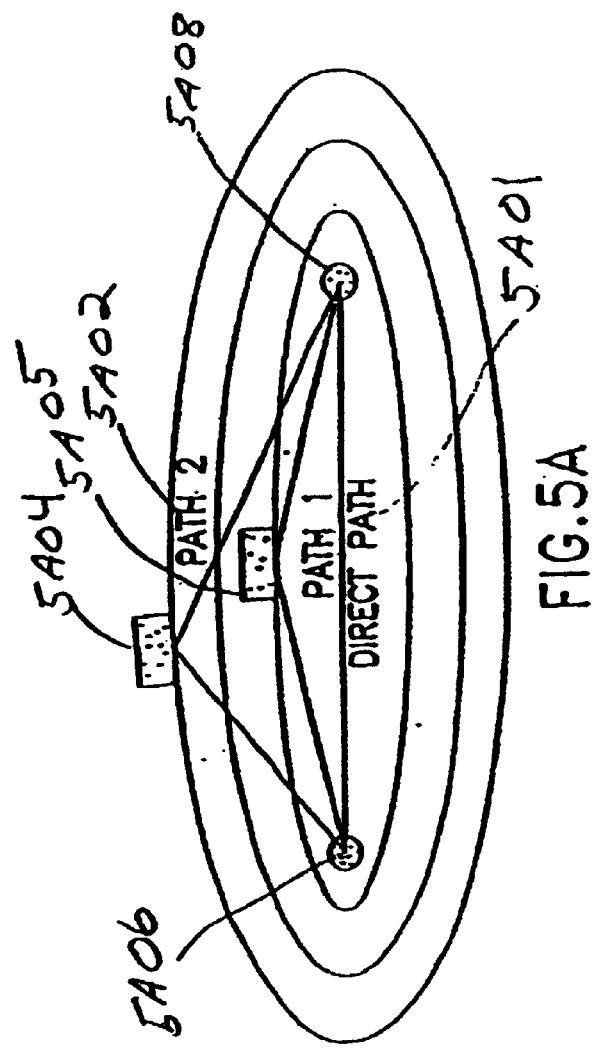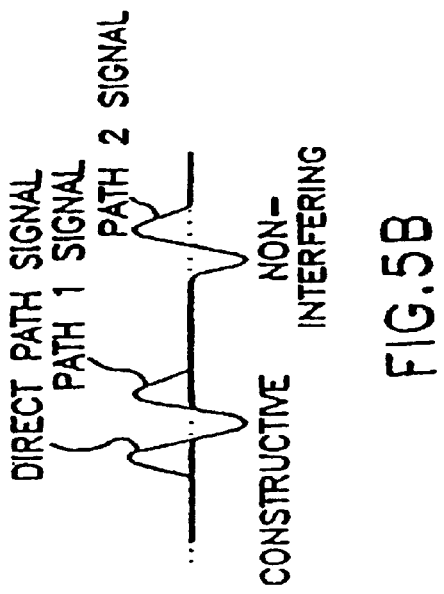

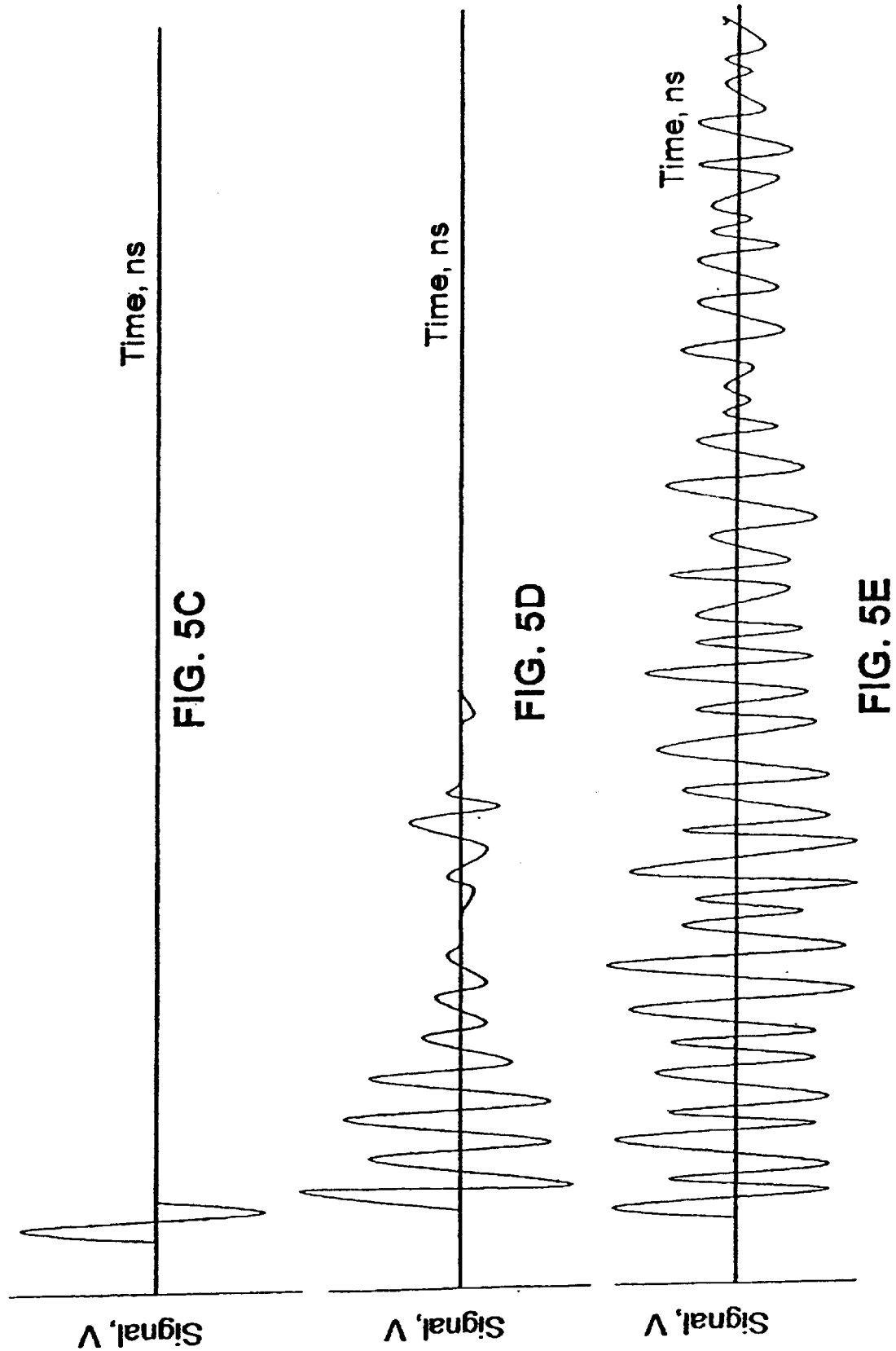

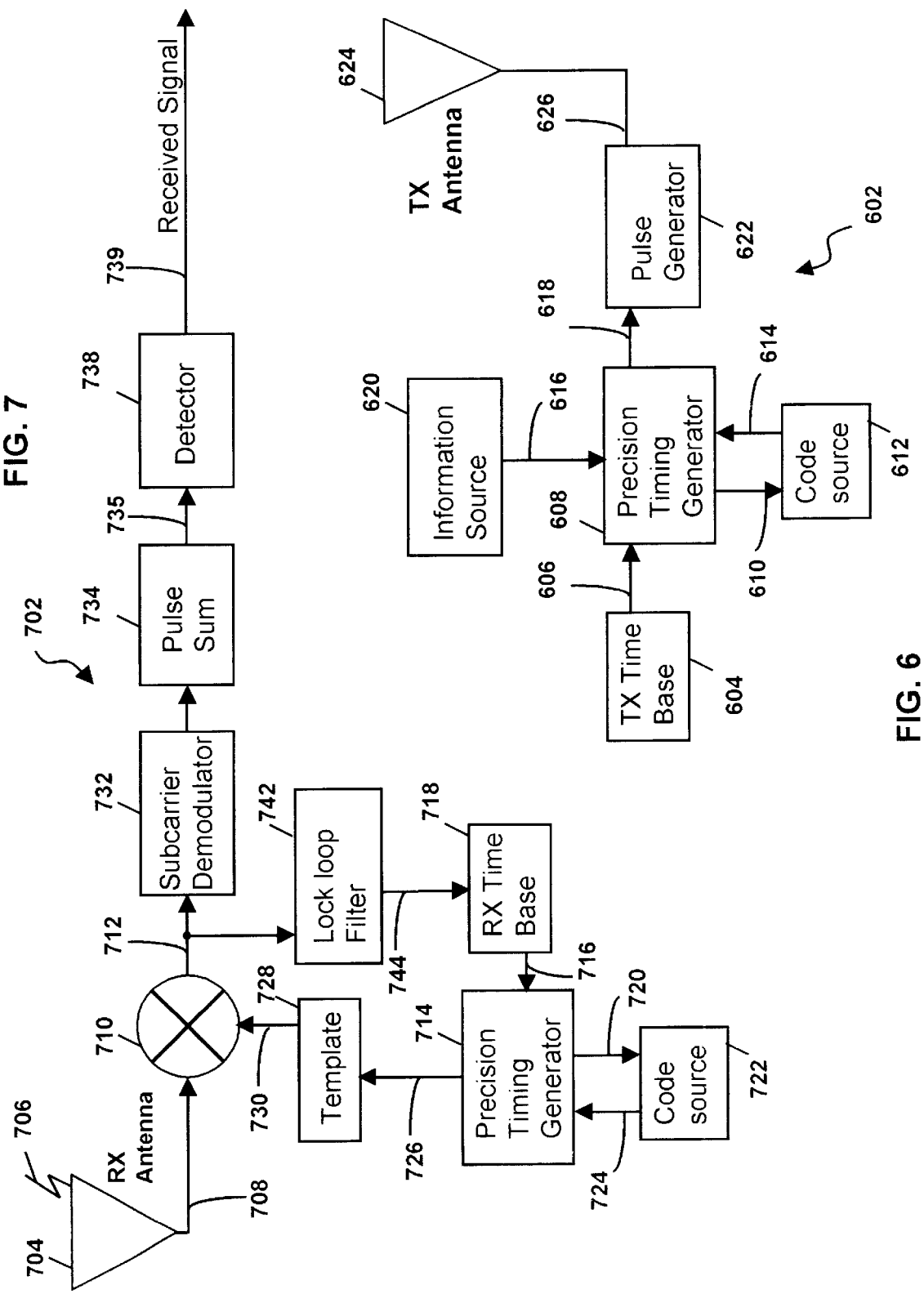

CORRESPONDING TO EACH Δt

METHOD FOR MITIGATING EFFECTS OF INTERFERENCE IN IMPULSE RADIO COMMUNICATION

BACKGROUND OF THE INVENTION

1. Field of the Invention

The present invention relates generally to radio communication effected using impulse radio. Still more particularity the present invention provides a method for mitigating adverse effects of electromagnetic interference in communicating using impulse radio wherein transmission rates (bit rates), signal strength, packet sizes and frequency of packet repetition, and other parameters associated with conveying a transmission message using impulse radio can vary according to the effect that interference may have upon impulse radio transmission quality.

2. Related Art

Recent advances in communications technology have enabled an emerging, revolutionary ultra wideband technology (UWB) called impulse radio communications systems (hereinafter called impulse radio).

Impulse radio was first fully described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,363,108 (issued Nov. 8, 1994) to Larry W. Fullerton. A second generation of impulse radio patents include U.S. Pat. Nos. 5,677,927 (issued Oct. 14, 1997) to Fullerton et al; and U.S. Pat. No. 5,687,169 (issued Nov. 11, 1997) and U.S. Pat. No. 5,832,035 (issued Nov. 3, 1998) to Fullerton. Theses patent documents are incorporated herein by reference.

Uses of impulse radio systems are described in U.S. patent application Ser. No. 09/332,502, entitled, "System and Method for Intrusion Detection Using a Time Domain Radar Array," and U.S. patent application Ser. No. 09/332,503, entitled, "Wide Area Time Domain Radar Array," both filed the same day as the present application, Jun. 14, 1999, both of which are assigned to the assignee of the present invention, and both of which are incorporated herein by reference.

Basic impulse radio transmitters emit short pulses approaching a Gaussian monocycle with tightly controlled pulse-to-pulse intervals. Impulse radio systems typically use pulse position modulation, which is a form of time modulation where the value of each instantaneous sample of a modulating signal is caused to modulate the position of a pulse in time.

For impulse radio communications, the pulse-to-pulse interval is varied on a pulse-by-pulse basis by two components: an information component and a pseudo-random code component. Unlike direct sequence spread spectrum systems, the pseudo-random code for impulse radio communications is not necessary for energy spreading because the monocycle pulses themselves have an inherently wide bandwidth. Instead, the pseudo-random code of an impulse radio system is used for channelization, energy smoothing in the frequency domain and for interference suppression.

Generally speaking, an impulse radio receiver is a direct conversion receiver with a cross correlator front end. The front end coherently converts an electromagnetic pulse train of monocycle pulses to a baseband signal in a single stage. The data rate of the impulse radio transmission is typically a fraction of the periodic timing signal used as a time base. Because each data bit modulates the time position of many pulses of the periodic timing signal, this yields a modulated, coded timing signal that comprises a train of identically shaped pulses for each single data bit. The impulse radio receiver integrates multiple pulses to recover the transmitted information.

In a multi-user environment, impulse radio depends, in part, on processing gain to achieve rejection of unwanted signals. Because of the extremely high processing gain achievable with impulse radio, much higher dynamic ranges are possible than are commonly achieved with other spread spectrum methods, some of which must use power control in order to have a viable system. Further, if power is kept to a minimum in an impulse radio system, this will allow closer operation in co-site or nearly co-site situations where two impulse radios must operate concurrently, or where an impulse radio and a narrow band radio must operate close by one another and share the same band.

In some multi-user environments where there is a high density of users in a coverage area or where data rates are so high that processing gain is marginal, power control may be used to reduce the multi-user background noise to improve the number of channels available and the aggregate traffic density of the area.

Other sources of noise, or electro magnetic interference, may also interfere with efficient communication using impulse radio technology. In communicating voice messages, data messages, control messages, or other types of messages, interference causes problems by corrupting information intended to be conveyed by the transmission message.

There is a need for mitigating the effects of electromagnetic interference, or noise, in communication using impulse radio.

In particular, there is a need for mitigating the effects of electromagnetic interference having various characteristics in communication using impulse radio.

SUMMARY OF THE INVENTION

A method for mitigating adverse effects of interference in impulse radio communication is disclosed. Transmission rates (bit rates), signal strength, packet sizes and frequency of packet repetition, and other parameters associated with conveying a transmission message using impulse radio may be varied advantageously to mitigate the effects of electromagnetic interference, whatever the source of the interference may be. The impulse radio communication conveys a transmission message from a transmitting station to a receiving station displaced from the transmitting station. The transmission message includes an information payload and overhead information. The interference has an expected occurrence period. The method comprises the steps of: (a) conveying the transmission message in a plurality of transmission packets; (b) repeating conveyance of selected packets of the plurality of packets; the conveying and the repeat conveying making up a repeat transmission package; and (c) conveying the repeat transmission package a plurality of times at a repeat conveyance period greater than twice said expected occurrence period.

The impulse radio communication may convey a transmission message from a proximate transmitter to a distal receiver, and include receiving a reception message by a proximate receiver from a distal transmitter. In such a duplex impulse radio communication system, the method comprises the steps of: (a) providing receiver-interference indications by the distal receiver to the proximate transmitter regarding interference conditions at the distal receiver; the receiver-interference indications including time indicators generally denote interference events; the interference events include a degeneration time when the interference conditions begin to unacceptably degrade the impulse radio communication, and include a regeneration time when the interference conditions return from unacceptably degrading the impulse radio communication to less than unacceptably interfering with the impulse radio communication; (b) mathematically manipulating the receiver-interference indications to determine predicted noise periods; the predicted noise periods are time periods during which the interference conditions are predicted to unacceptably degrade the impulse radio communication; and (c) operating the proximate transmitter to convey the transmission message according to at least one of the following criteria: (1) avoiding conveying the transmission message during the predicted noise periods; (2) effecting the conveying the transmission message at a higher conveying power during the predicted noise periods; (3) varying error detection coding in the transmission message during the predicted noise periods; and (4) retransmitting at least a portion of the transmission message during periods following the predicted noise periods. The choices for operating criteria may further include: (5) avoiding conveying the transmission message when the receiver-interference is present in an interference strength greater than a first predetermined interference strength; (6) effecting the conveying the transmission message at a higher conveying power when the receiver-interference is present in an interference strength greater than a second predetermined interference strength; (7) varying error detection coding in the transmission message when the receiver-interference is present in an interference strength interference strength greater than a third predetermined interference strength; and (8) retransmitting at least a portion of the transmission message after the receiver-interference has been present in an interference strength greater than a fourth predetermined interference strength and has subsided to an interference strength less than a fifth predetermined interference strength. Other operating criteria are also appropriate and are discussed in greater detail later herein.

Some noise, or interference, may be periodic in nature, with a constant period or with a period that varies over time (i.e., quasi-periodic). Such periodic or quasi-periodic noise may be substantially predicted, at least within a limited time period. Other electromagnetic interference may be intermittent and less predictable. Usually no one type of interference occurs alone; most likely an impulse radio communication system will encounter a variety of interference, having varying periodicity or unpredictability, varying strengths, and other varying parameters.

It is therefore an object of the present invention to provide a novel method for mitigating adverse effects of electromagnetic interference in impulse radio communication.

Further objects and features of the present invention will be apparent from the following specification and claims when considered in connection with the accompanying drawings, in which like elements are labeled using like reference numerals in the various figures, illustrating the preferred embodiments of the invention.

BRIEF DESCRIPTION OF THE DRAWINGS

The present invention is described with reference to the accompanying drawings. In the drawings, like reference numbers indicate identical or functionally similar elements.

FIG. 5A illustrates a typical geometrical configuration giving rise to multipath received signals.

FIG. 5B illustrates exemplary multipath signals in the time domain.

FIGS. 5C–5E illustrate a signal plot of various multipath environments.

FIG. 6 illustrates a representative impulse radio transmitter functional diagram.

FIG. 7 illustrates a representative impulse radio receiver functional diagram.

DETAILED DESCRIPTION OF THE EMBODIMENTS

Overview of the Invention

Figure 1B:
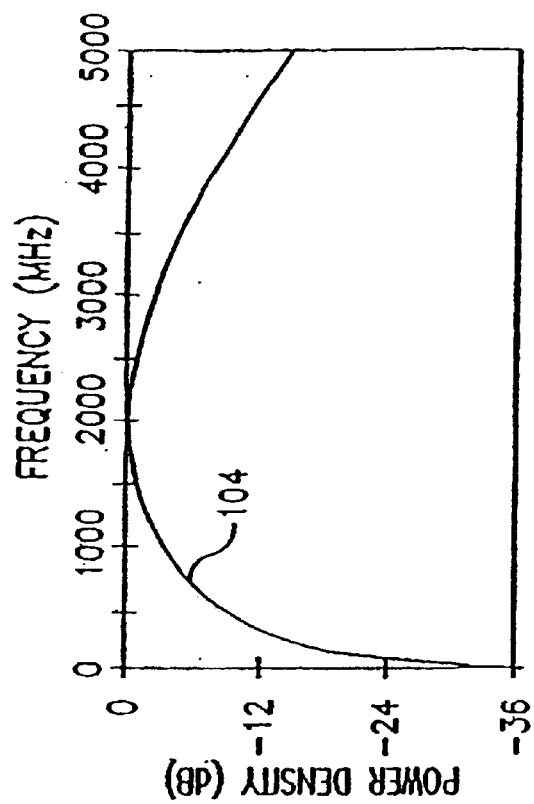
FIG. 1B illustrates the frequency domain amplitude of the Gaussian Monocycle of FIG. 1A.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in art. Like numbers refer to like elements throughout.

Impulse Radio Basics

This section is directed to technology basics and provides the reader with an introduction to impulse radio concepts, as well as other relevant aspects of communications theory. This section includes subsections relating to waveforms, pulse trains, coding for energy smoothing and channelization, modulation, reception and demodulation, interference resistance, processing gain, capacity, multipath and propagation, distance measurement, and qualitative and quantitative characteristics of these concepts. It should be understood that this section is provided to assist the reader with understanding the present invention, and should not be used to limit the scope of the present invention.

Impulse radio refers to a radio system based on short, low duty cycle pulses. An ideal impulse radio waveform is a short Gaussian monocycle. As the name suggests, this waveform attempts to approach one cycle of radio frequency (RF) energy at a desired center frequency. Due to implementation and other spectra limitations, this waveform may be altered significantly in practice for a given application. Most waveforms with enough bandwidth approximate a Gaussian shape to a useful degree.

Impulse radio can use many types of modulation, including AM, time shift (also referred to as pulse position) and M-ary versions. The time shift method has simplicity and power output advantages that make it desirable. In this document, the time shift method is used as an illustrative example.

In impulse radio communications the pulse-to-pulse interval can be varied on a pulse-by-pulse basis by two components: an information component and a pseudo-random code component. Generally, conventional spread spectrum systems make use of pseudo-random codes to spread the normally narrow band information signal over a relatively wide band of frequencies. A conventional spread spectrum receiver correlates these signals to retrieve the original information signal. Unlike conventional spread spectrum systems, the pseudo-random code for impulse radio communications is not necessary for energy spreading because the monocycle pulses themselves have an inherently wide bandwidth. Instead, the pseudo-random code is used for channelization, energy smoothing in the frequency domain, resistance to interference, and reducing the interference potential to nearby receivers.

The impulse radio receiver is typically a direct conversion receiver with a cross correlator front end in which the front end coherently converts an electromagnetic pulse train of monocycle pulses to a baseband signal in a single stage. The baseband signal is the basic information signal for the impulse radio communications system. It is often found desirable to include a subcarrier with the baseband signal to help reduce the effects of amplifier drift and low frequency noise. The subcarrier that is typically implemented alternately reverses modulation according to a known pattern at a rate faster than the data rate. This same pattern is used to reverse the process and restore the original data pattern just before detection. This method permits alternating current (AC) coupling of stages, or equivalent signal processing to eliminate direct current (DC) drift and errors from the detection process. This method is described in detail in U.S. Pat. No. 5,677,927 to Fullerton et al.

In impulse radio communications utilizing time shift modulation, each data bit typically time position modulates many pulses of the periodic timing signal. This yields a modulated, coded timing signal that comprises a train of identically shaped pulses for each single data bit. The impulse radio receiver integrates multiple pulses to recover the transmitted information.

Waveforms

Impulse radio refers to a radio system based on short, low duty cycle pulses. In the widest bandwidth embodiment, the resulting waveform approaches one cycle per pulse at the center frequency. In more narrow band embodiments, each pulse consists of a burst of cycles usually with some spectral shaping to control the bandwidth to meet desired properties such as out of band emissions or in-band spectral flatness, or time domain peak power or burst off time attenuation.

For system analysis purposes, it is convenient to model the desired waveform in an ideal sense to provide insight into the optimum behavior for detail design guidance. One such waveform model that has been useful is the Gaussian monocycle as shown in FIG. 1A. This waveform is representative of the transmitted pulse produced by a step function into an ultra-wideband antenna. The basic equation normalized to a peak value of 1 is as follows:

$$f_{mono}(t) = \sqrt{e}\left(\frac{t}{\sigma}\right)e^{\frac{-t^2}{2\sigma^2}}$$

Where, $\sigma$ is a time scaling parameter, t is time, $f_{mono}(t)$ is the waveform voltage, and e is the natural logarithm base.

Figure 1A:
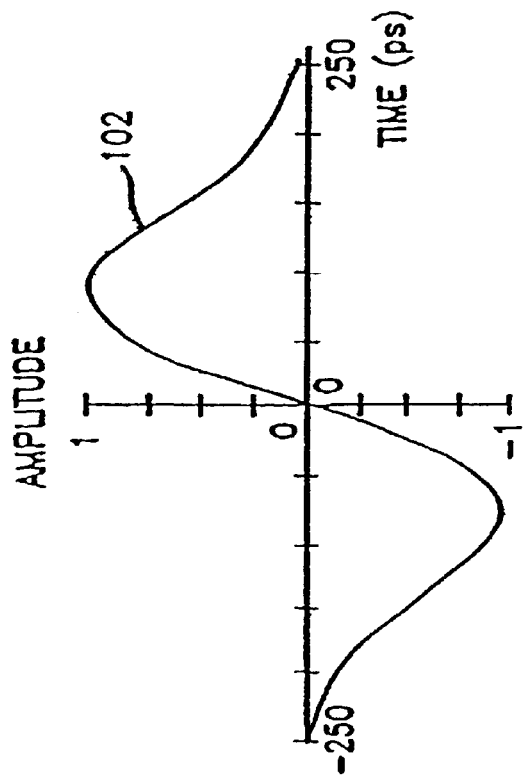
FIG. 1A illustrates a representative Gaussian Monocycle waveform in the time domain.

The frequency domain spectrum of the above waveform is shown in FIG. 1B. The corresponding equation is:

$$F_{mono}(f) = (2\pi)^{\frac{3}{2}}\sigma f e^{-2(\pi \sigma f)^2}$$

The center frequency ($f_c$), or frequency of peak spectral density is:

$$f_c = \frac{1}{2\pi\sigma}$$

These pulses, or bursts of cycles, may be produced by methods described in the patents referenced above or by other methods that are known to one of ordinary skill in the art. Any practical implementation will deviate from the ideal mathematical model by some amount. In fact, this deviation from ideal may be substantial and yet yield a system with acceptable performance. This is especially true for microwave implementations, where precise waveform shaping is difficult to achieve. These mathematical models are provided as an aid to describing ideal operation and are not intended to limit the invention. In fact, any burst of cycles that adequately fills a given bandwidth and has an adequate on-off attenuation ratio for a given application will serve the purpose of this invention.

A Pulse Train

Impulse radio systems can deliver one or more data bits per pulse; however, impulse radio systems more typically use pulse trains, not single pulses, for each data bit. As described in detail in the following example system, the impulse radio transmitter produces and outputs a train of pulses for each bit of information.

Figure 2B:
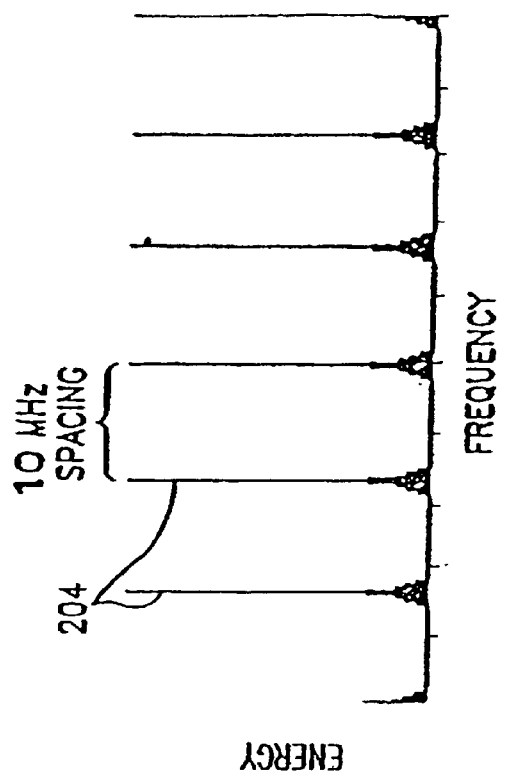
FIG. 2B illustrates the frequency domain amplitude of the waveform of FIG. 2A.
Figure 2A:
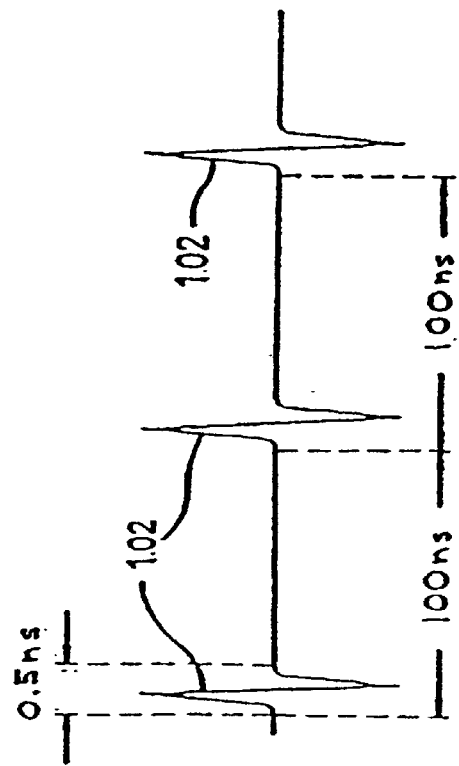
FIG. 2A illustrates a pulse train comprising pulses as in FIG. 1A.

Prototypes built by the inventors have pulse repetition frequencies including 0.7 and 10 megapulses per second (Mpps, where each megapulse is $10^6$ pulses). FIGS. 2A and 2B are illustrations of the output of a typical 10 Mpps system with uncoded, unmodulated, 0.5 nanosecond (ns) pulses 102. FIG. 2A shows a time domain representation of this sequence of pulses 102. FIG. 2B, which shows 60 MHz at the center of the spectrum for the waveform of FIG. 2A, illustrates that the result of the pulse train in the frequency domain is to produce a spectrum comprising a set of lines 204 spaced at the frequency of the 10 Mpps pulse repetition rate. When the full spectrum is shown, the envelope of the line spectrum follows the curve of the single pulse spectrum 104 of FIG. 1B. For this simple uncoded case, the power of the pulse train is spread among roughly two hundred comb lines. Each comb line thus has a small fraction of the total power and presents much less of an interference problem to receiver sharing the band.

It can also be observed from FIG. 2A that impulse radio systems typically have very low average duty cycles resulting in average power significantly lower than peak power. The duty cycle of the signal in the present example is 0.5%, based on a 0.5 ns pulse in a 100 ns interval.

Coding for Energy Smoothing and Channelization

For high pulse rate systems, it may be necessary to more finely spread the spectrum than is achieved by producing comb lines. This may be done by pseudo-randomly positioning each pulse relative to its nominal position.

Figure 3:
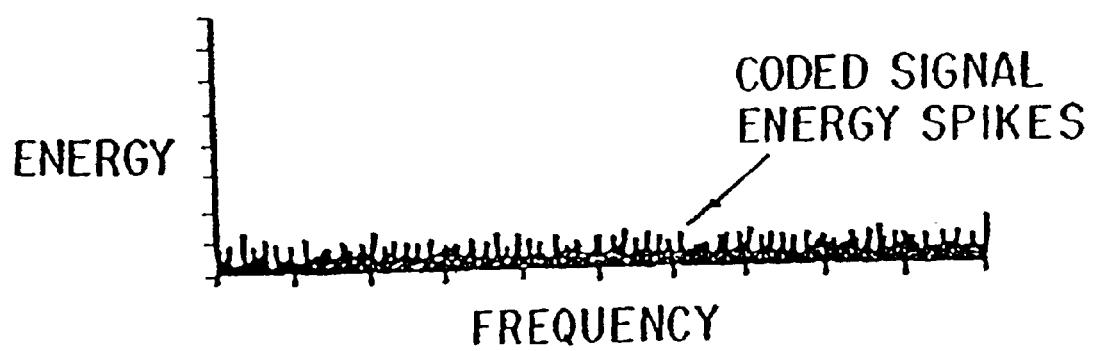
FIG. 3 illustrates the frequency domain amplitude of a sequence of time coded pulses.

FIG. 3 is a plot illustrating the impact of a pseudo-noise (PN) code dither on energy distribution in the frequency domain (A pseudo-noise, or PN code is a set of time positions defining the pseudo-random positioning for each pulse in a sequence of pulses). FIG. 3, when compared to FIG. 2B, shows that the impact of using a PN code is to destroy the comb line structure and spread the energy more uniformly. This structure typically has slight variations which are characteristic of the specific code used.

The PN code also provides a method of establishing independent communication channels using impulse radio. PN codes pan be designed to have low cross correlation such that a pulse train using one code will seldom collide on more than one or two pulse positions with a pulses train using another code during any one data bit time. Since a data bit may comprise hundreds of pulses, this represents a substantial attenuation of the unwanted channel.

Modulation

Any aspect of the waveform can be modulated to convey information. Amplitude modulation, phase modulation, frequency modulation, time shift modulation and M-ary versions of these have been proposed. Both analog and digital forms have been implemented. Of these, digital time shift modulation has been demonstrated to have various advantages and can be easily implemented using a correlation receiver architecture.

Digital time shift modulation can be implemented by shifting the coded time position by an additional amount (that is, in addition to PN code dither) in response to the information signal. This amount is typically very small relative to the PN code shift. In a 10 Mpps system with a center frequency of 2 GHz., for example, the PN code may command pulse position variations over a range of 100 ns; whereas, the information modulation may only deviate the pulse position by 150 ps.

Thus, in a pulse train of n pulses, each pulse is delayed a different amount from its respective time base clock position by an individual code delay amount plus a modulation amount, where n is the number of pulses associated with a given data symbol digital bit.

Modulation further smooths the spectrum, minimizing structure in the resulting spectrum.

Reception and Demodulation

Clearly, if there were a large number of impulse radio users within a confined area, there might be mutual interference. Further, while the PN coding minimizes that interference, as the number of users rises, the probability of an individual pulse from one user's sequence being received simultaneously with a pulse from another user's sequence increases. Impulse radios are able to perform in the se environments, in part, because they do not depend on receiving every pulse. The impulse radio receiver performs a correlating, synchronous receiving function (at the RF level) that uses a statistical sampling and combining of many pulses to recover the transmitted information.

Impulse radio receivers typically integrate from 1 to 1000 or more pulses to yield the demodulated output. The optimal number of pulses over which the receiver integrates is dependent on a number of variables, including pulse rate, bit rate, interference levels, and range.

Interference Resistance

Besides channelization and energy smoothing, the PN coding also makes impulse radios highly resistant to interference from all radio communications systems, including other impulse radio transmitters. This is critical as any other signals within the band occupied by an impulse signal potentially interfere with the impulse radio. Since there are currently no unallocated bands available for impulse systems, they must share spectrum with other conventional radio systems without being adversely affected. The PN code helps impulse systems discriminate between the intended impulse transmission and interfering transmissions from others.

Figure 4:
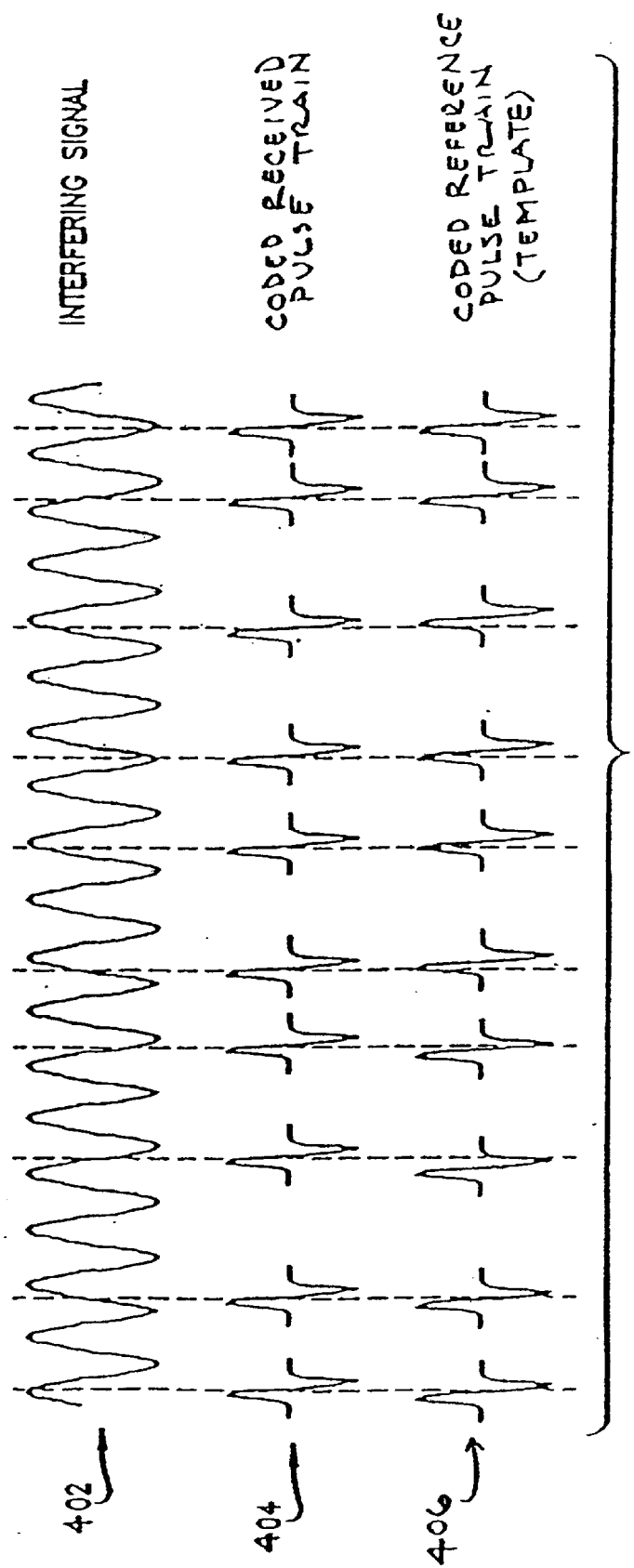
FIG. 4 illustrates a typical received signal and interference signal.

FIG. 4 illustrates the result of a narrow band sinusoidal interference signal 402 overlaying an impulse radio signal 404. At the impulse radio receiver, the input to the cross correlation would include the narrow band signal 402, as well as the received ultrawide-band impulse radio signal 404. The input is sampled by the cross correlator with a PN dithered template signal 406. Without PN coding, the cross correlation would sample the interfering signal 402 with such regularity that the interfering signals could cause significant interference to the impulse radio receiver. However, when the transmitted impulse signal is encoded with the PN code dither (and the impulse radio receiver template signal 406 is synchronized with that identical PN code dither) the correlation samples the interfering signals pseudo-randomly. The samples from the interfering signal add incoherently, increasing roughly according to square root of the number of samples integrated; whereas, the impulse, radio samples add coherently, increasing directly according to the number of samples integrated. Thus, integrating over many pulses overcomes the impact of interference.

Processing Gain

Impulse radio is resistant to interference because of its large processing gain. For typical spread spectrum systems, the definition of processing gain, which quantifies the decrease in channel interference when wide-band communications are used, is the ratio of the bandwidth of the channel to the bit rate of the information signal. For example, a direct sequence spread spectrum system with a 10 kHz information bandwidth and a 10 MHz channel bandwidth yields a processing gain of 1000 or 30 dB. However, far greater processing gains are achieved with impulse radio systems, where for the same 10 kHz information bandwidth is spread across a much greater 2 GHz. channel bandwidth, the theoretical processing gain is 200, 000 or 53 dB.

Capacity

It has been shown theoretically, using signal to noise arguments, that thousands of simultaneous voice channels are available to an impulse radio system as a result of the exceptional processing gain, which is due to the exceptionally wide spreading bandwidth.

For a simplistic user distribution, with N interfering users of equal power equidistant from the receiver, the total interference signal to noise ratio as a result of these other users can be described by the following equation:

$$V_{tot}^2 = \frac{N\sigma^2}{\sqrt{Z}}$$

Where $V^2_{tot}$ is the total interference signal to noise ratio variance, at the receiver;

N is the number of interfering users;

$\sigma^2$ is the signal to noise ratio variance resulting from one of the interfering signals with a single pulse cross correlation; and Z is the number of pulses over which the receiver integrates to recover the modulation.

This relationship suggests that link quality degrades gradually as the number of simultaneous users increases. It also shows the advantage of integration gain. The number of users that can be supported at the same interference level increases by the square root of the number of pulses integrated.

Multipath and Propagation

One of the striking advantages of impulse radio is its resistance to multipath fading effects. Conventional narrow band systems are subject to multipath through the Rayleigh fading process, where the signals from many delayed reflections combine at the receiver antenna according to their seemingly random relative phases. This results in possible summation or possible cancellation, depending on the specific propagation to a given location. This situation occurs where the direct path signal is weak relative to the multipath signals, which represents a major portion of the potential coverage of a radio system. In mobile systems, this results in wild signal strength fluctuations as a function of distance traveled, where the changing mix of multipath signals results in signal strength fluctuations for every few feet of travel.

Impulse radios, however, can be substantially resistant to these effects. Impulses arriving from delayed multipath reflections typically arrive outside of the correlation time and thus can be ignored. This process is described in detail with reference to FIGS. 5A and 5B. In FIG. 5A, three propagation paths are shown. The direct path representing the straight line distance between the transmitter and receiver is the shortest. Path 1 represents a grazing multipath reflection, which is very close to the direct path. Path 2 represents a distant multipath reflection. Also shown are elliptical (or, in space, ellipsoidal) traces that represent other possible locations for reflections with the same time delay.

FIG. 5B represents a time domain plot of the received waveform from this multipath propagation configuration. This figure comprises three doublet pulses as shown in FIG. 1A. The direct path signal is the reference signal and represents the shortest propagation time. The path 1 signal is delayed slightly and actually overlaps and enhances the signal strength at this delay value. Note that the reflected waves are reversed in polarity. The path 2 signal is delayed sufficiently that the waveform is completely separated from the direct path signal. If the correlator template signal is positioned at the direct path signal, the path 2 signal will produce no response. It can be seen that only the multipath signals resulting from very close reflectors have any effect on the reception of the direct path signal. The multipath signals delayed less than one quarter wave (one quarter wave is about 1.5 inches, or 3.5 cm at 2 GHz center frequency) are the only multipath signals that can attenuate the direct path signal. This region is equivalent to the first Fresnel zone familiar to narrow band systems designers. Impulse radio, however, has no further nulls in the higher Fresnel zones. The ability to avoid the highly variable attenuation from multipath gives impulse radio significant performance advantages.

FIG. 5A illustrates a typical multipath situation, such as in a building, where there are many reflectors 5A04, 5A05 and multiple propagation paths 5A02, 5A01. In this figure, a transmitter TX 5A06 transmits a signal which propagates along the multiple propagation paths 5A02, 5A04 to receiver RX 5A08, where the multiple reflected signals are combined at the antenna.

FIG. 5B illustrates a resulting typical received composite pulse waveform resulting from the multiple reflections and multiple propagation paths 5A01, 5A02. In this figure, the direct path signal 5A01 is shown as the first pulse signal received. The multiple reflected signals ("multipath signals", or "multipath") comprise the remaining response as illustrated.

FIGS. 5C, 5D, and 5E represent the received signal from a TM-UWB transmitter in three different multipath environments. These figures are not actual signal plots, but are hand drawn plots approximating typical signal plots. FIG. 5C illustrates the received signal in a very low multipath environment. This may occur in a building where the receiver antenna is in the middle of a room and is one meter from the transmitter. This may also represent signals received from some distance, such as 100 meters, in an pen field where there are no objects to produce reflections. In this situation, the predominant pulse is the first received pulse and the multipath reflections are too weak to be significant. FIG. 5D illustrates an intermediate multipath environment. This approximates the response from one room to the next in a building. The amplitude of the direct path signal is less than in FIG. 5C and several reflected signals are of significant amplitude. (Note that the scale has been increased to normalize the plot.) FIG. 5E approximates the response in a severe multipath environment such as: propagation through many rooms; from corner to corner in a building; within a metal cargo hold of a ship; within a metal truck trailer; or within an intermodal shipping container. In this scenario, the main path signal is weaker than in FIG. 5D. (Note that the scale has been increased again to normalize the plot.) In this situation, the direct path signal power is small relative to the total signal power from the reflections.

An impulse radio receiver in accordance with the present invention can receive the signal and demodulate the information using either the direct path signal or any multipath signal peak having sufficient signal to noise ratio. Thus, the impulse radio receiver can select the strongest response from among the many arriving signals. In order for the signals to cancel and produce a null at a given location, dozens of reflections would have to be cancelled simultaneously and precisely while blocking the direct path a highly unlikely scenario. This time separation of multipath signals together with time resolution and selection by the receiver permit a type of time diversity that virtually eliminates cancellation of the signal. In a multiple correlator rake receiver, performance is further improved by collecting the signal power from multiple signal peaks for additional signal to noise performance.

Where the system of FIG. 5A is a narrow band system and the delays are small relative to the data bit time, the received signal is a sum of a large number of sine waves of random amplitude and phase. In the idealized limit, the resulting envelope amplitude has been shown to follow a Rayleigh probability distribution as follows:

$$p(r) = \frac{1}{\sigma^2} \exp\left(\frac{-r^2}{2\sigma^2}\right)$$

where r is the envelope amplitude of the combined multipath signals, and $2\sigma^2$ is the RMS power of the combined multipath signals.

Figure 5F:
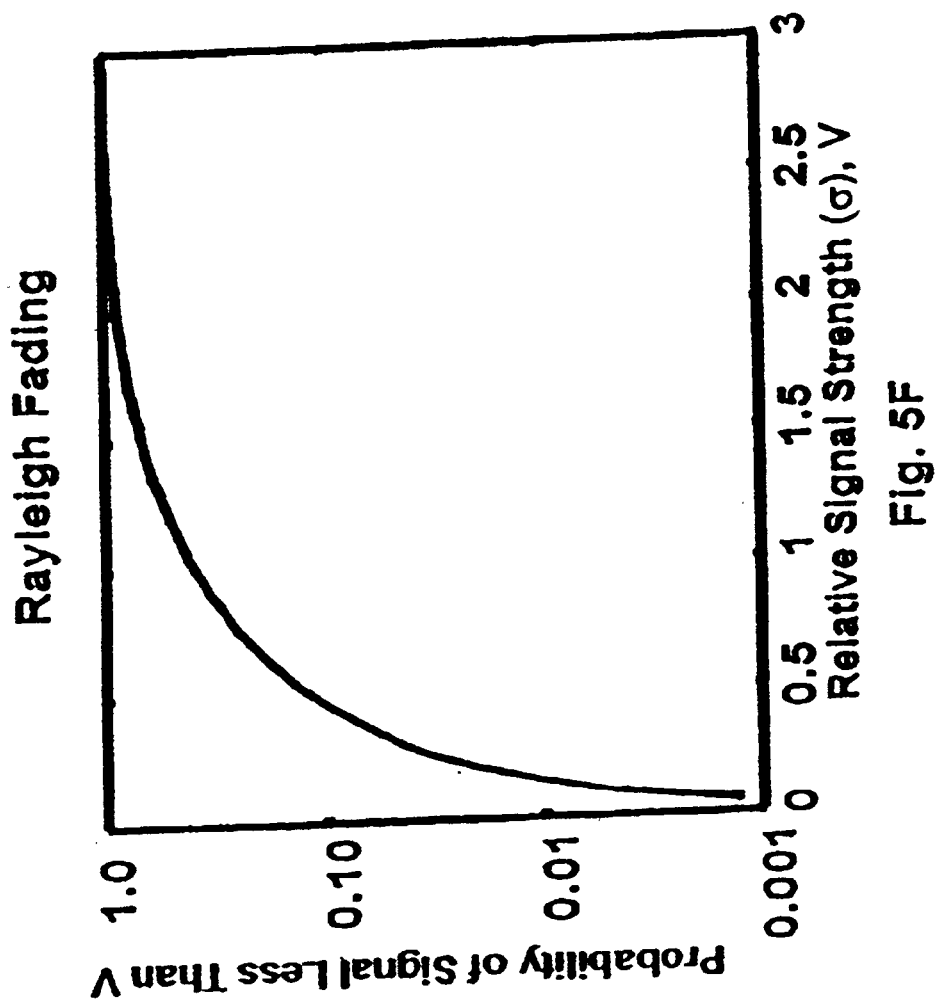
FIG. 5F illustrates the Rayleigh fading curve associated with non-impulse radio transmissions in a multipath environment.

This distribution shown in FIG. 5F. It can be seen in FIG. 5F that 10% of the time, the signal is more than 16 dB attenuated. This suggests that 16 dB fade margin is needed to provide 90% link availability. Values of fade margin from 10 to 40 dB have been suggested for various narrow band systems, depending on the required reliability. This characteristic has been the subject of much research and can be partially improved by such techniques as antenna and frequency diversity, but these techniques result in additional complexity and cost.

Figure 5G:
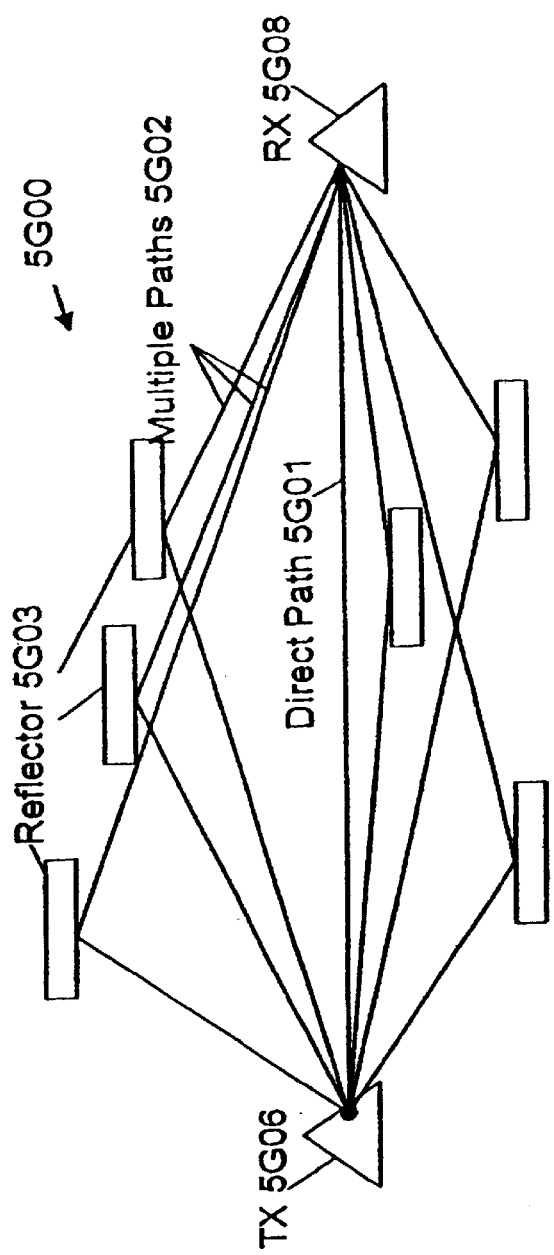
FIG. 5G illustrates a plurality of multipaths with a plurality of reflectors from a transmitter to a receiver.
Figure 5H:
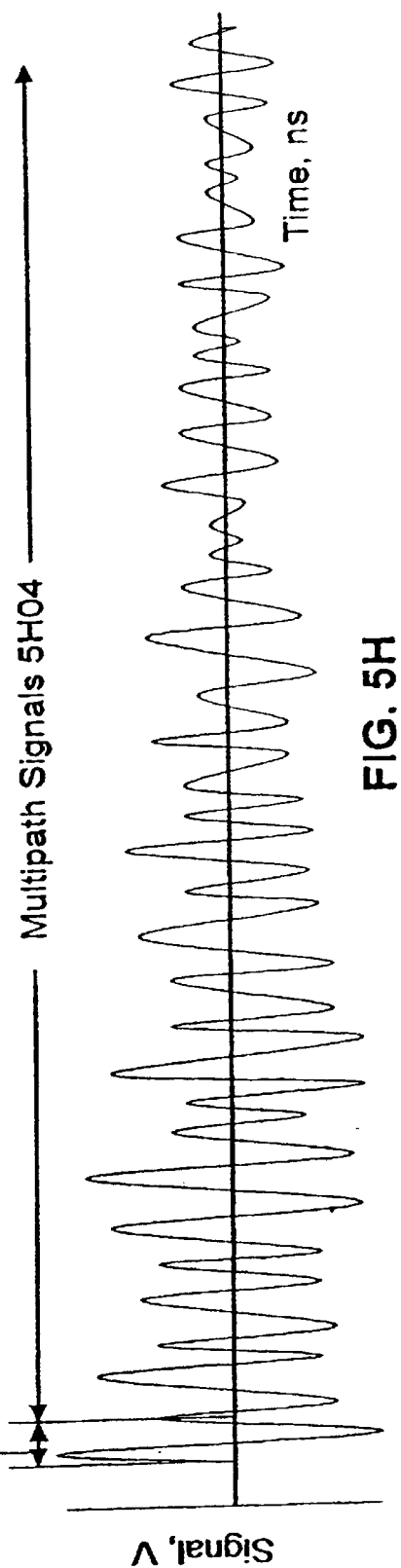
FIG. 5H graphically represents signal strength as volts vs. time in a direct path and multipath environment.

In a high multipath environment such as inside homes, offices, warehouses, automobiles, trailers, shipping containers, or outside in the urban canyon or other situations where the propagation is such that the received signal is primarily scattered energy, impulse radio, according to the present invention, can avoid the Rayleigh fading mechanism that limits performance of narrow band systems. This is illustrated in FIGS. 5G and 5H in a transmit and receive system in a high multipath environment 5G00, wherein the transmitter 5G06 transmits to receiver 5G08 with the signals reflecting off reflectors 50G3 which form multipaths 5002. The direct path is illustrated as 5G01 with the signal graphically illustrated at 5H02 with the vertical axis being the signal strength in volts and horizontal axis representing time in nanoseconds. Multipath signals are graphically illustrated at 5H04.

Distance Measurement and Position Location

Impulse systems can measure distances to extremely fine resolution because of the absence of ambiguous cycles in the waveform. Narrow band systems, on the other hand, are limited to the modulation envelope and cannot easily distinguish precisely which RF cycle is associated with each data bit because the cycle-to-cycle amplitude differences are so small they are masked by link or system noise. Since the impulse radio waveform has no multi-cycle ambiguity, this allows positive determination of the waveform position to less than a wavelength—potentially, down to the noise floor of the system. This time position measurement can be used to measure propagation delay to determine link distance, and once link distance is known, to transfer a time reference to an equivalently high degree of precision. The inventors of the present invention have built systems that have shown the potential for centimeter distance resolution, which is equivalent to about 30 ps of time transfer resolution. See, for example, commonly owned, co-pending application Ser. No. 09/045,929, filed Mar. 23, 1998, titled "Ultrawide-Band Position Determination System and Method", and Ser. No. 09/083,993, filed May 26, 1998, titled "System and Method for Distance Measurement by Inphase and Quadrature Signals in a Radio System", both of which are incorporated herein by reference. Finally, distance measuring and position location using impulse radio using a plurality of distance architectures is enabled in co-pending and commonly owned U.S. patent application Ser. No. 09/456,409, filed Dec. 8, 1999, titled "System and Method for Person or Object Position Location Utilizing Impulse Radio."

Exemplary Transceiver Implementation

Transmitter

An exemplary embodiment of an impulse radio transmitter 602 of an impulse radio communication system having one subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614 together with an internally generated subcarrier signal (which is optional) and an information signal 616 to generate a modulated, coded timing signal 618.

The code source 612 comprises a storage device such as a random access memory (RAM), read only memory (ROM), or the like, for storing suitable PN codes and for outputting the PN codes as a code signal 614. Alternatively, maximum length shift registers or other computational means can be used to generate the PN codes.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger to generate output pulses. The output pulses are sent to a transmit antenna 624 via a transmission line 626 coupled thereto. The output pulses are converted into propagating electromagnetic pulses by the transmit antenna 624. In the present embodiment, the electromagnetic pulses are called the emitted signal, and propagate to an impulse radio receiver 702, such as shown in FIG. 7, through a propagation medium, such as air, in a radio frequency embodiment. In a preferred embodiment, the emitted signal is wide-band or ultrawide-band, approaching a monocycle pulse as in FIG. 1A. However, the emitted signal can be spectrally modified by filtering of the pulses. This filtering will usually cause each monocycle pulse to have more zero crossings (more cycles) in the time domain. In this case, the impulse radio receiver can use a similar waveform as the template signal in the cross correlator for efficient conversion.

Receiver

An exemplary embodiment of an impulse radio receiver 702 (hereinafter called the receiver) for the impulse radio communication system is now described with reference to FIG. 7. More specifically, the system illustrated in FIG. 7 is for reception of digital data wherein one or more pulses are transmitted for each data bit.

The receiver 702 comprises a receive antenna 704 for receiving a propagated impulse radio signal 706. A received signal 708 from the receive antenna 704 is coupled to a cross correlator or sampler 710 to produce a baseband output 712. The cross correlator or sampler 710 includes multiply and integrate functions together with any necessary filters to optimize signal to noise ratio.

The receiver 702 also includes a precision timing generator 714, which receives a periodic timing signal 716 from a receiver time base 718. This time base 718 is adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the; originating transmitter 602 to generate the propagated signal 706. Thus, the timing of the template pulse train 730 matches the timing of the received signal pulse train 708, allowing the received signal 708 to be synchronously sampled in the correlator 710. The correlator 710 ideally comprises a multiplier followed by a short term integrator to sum the multiplier product over the pulse interval. Further examples and details of correlation and sampling processes can be found in commonly owned U.S. Pat. Nos. 4,641,317, 4,743,906, 4,813,057 and 4,979,186 which are incorporated herein by reference, and commonly owned and co-pending application Ser. No. 09/356,384, filed Jul. 16, 1999, titled: "Baseband Signal Converter Device for a Wideband Impulse Radio Receiver," which is incorporated herein by reference.

The output of the correlator 710, also called a baseband signal 712, is coupled to a subcarrier demodulator 732, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator 732 is then filtered or integrated in a pulse summation stage 734. The pulse summation stage produces an output representative of the sum of a number of pulse signals comprising a single data bit. The output of the pulse summation stage 734 is then compared with a nominal zero (or reference) signal output in a detector stage 738 to determine an output signal 739 representing an estimate of the original information signal 616.

The baseband signal 712 is also input to a lowpass filter 742 (also referred to as lock loop filter 742). A control loop comprising the lowpass filter 742, time base 718, precision timing generator 714, template generator 728, and correlator 710 is used to generate a filtered error signal 744. The filtered error signal 744 provides adjustments to the adjustable time base 718 to time position the periodic timing signal 726 in relation to the position of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

Figure 8A:
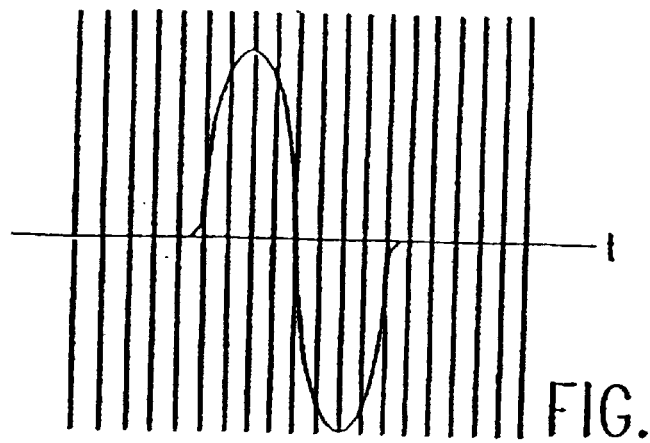
FIG. 8A illustrates a representative received pulse signal at the input to the correlator.
Figure 8B:
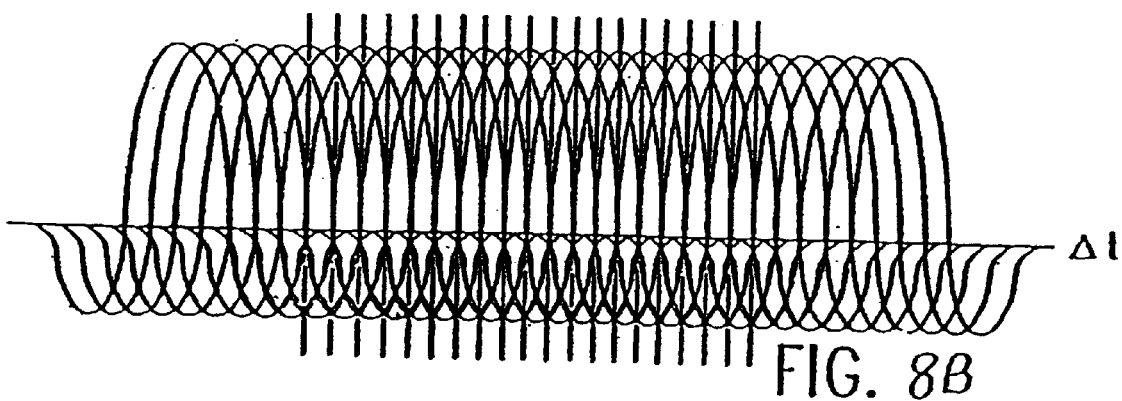
FIG. 8B illustrates a sequence of representative impulse signals in the correlation process.
Figure 8C:
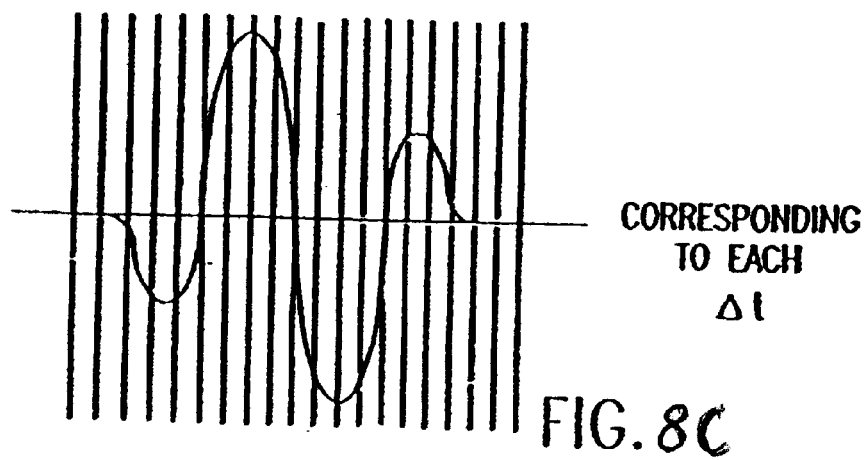
FIG. 8C illustrates the output of the correlator for each of the time offsets of FIG. 8B.

FIGS. 8A–8C illustrate the cross correlation process and the correlation function. FIG. 8A shows the waveform of a template signal. FIG. 8B shows the waveform of a received impulse radio signal at a set of several possible time offsets. FIG. 8C represents the output of the correlator (multiplier and short time integrator) for each of the time offsets of FIG. 8B. Thus, this graph, FIG. 8C, does not show a waveform that is a function of time, but rather a function of time-offset, i.e., for any given pulse received, there is only one corresponding point which is applicable on this graph. This is the point corresponding to the time offset of the template signal used to receive that pulse.

Further examples and details of subcarrier processes and precision timing can be found described in U.S. Pat. No. 5,677,927, titled "An Ultrawide-Band Communications System and Method", and commonly owned co-pending application Ser. No. 09/146,524, filed Sep. 3, 1998, titled "Precision Timing Generator System and Method", both of which are incorporated herein by reference.

Impulse Radio as Used in the Present Invention

When utilized in a radio communication network, the characteristics of impulse radio significantly improve the state of the art. One may take two general approaches to mitigating the effects of interference with impulse radio communication. First, one may provide fast-reaction capabilities for reacting to noise as it is detected, and taking mitigating action in response to such noise detections. Second, one may predict aggregate noise and anticipatorily take mitigating action to reduce the effects of interference.

When an impulse radio communication system according to the present invention operates in an environment involving electromagnetic interference or noise. Electromagnetic interference may be considered as an interfering signal having periodicity, such as a sine wave structure. Noise may be regarded as any, interfering signal, including electromagnetic interference and broadband signals, often referred to as Gaussian noise or white noise. In the context of this application the two terms are used interchangeably in so far as the characteristics of the noise, or interference, signal are as described and treated herein. It is desirable that the effects of such noise be mitigated in as much as is possible without degrading operating efficiency. There are two general approaches to mitigating electromagnetic interference: forward systems and feedback systems.

Forward systems look to anticipate problems caused by noise and anticipatorily remedy, or mitigate the effects of the noise. In the context of the present invention, it is expected that communications will be accomplished by generally transmitting traffic containing message information and overhead information. Message information is generally information containing intelligence of some sort intended to be conveyed to a receiver in an understandable form relating a message of some sort. Overhead information is information intended primarily for use by the communication system to enhance robustness and continuity of the transmission of the message information. Overhead information includes, by way of example, error detection coding, error correction coding, timing information, encryption coding information, and other similar information.

One forward looking approach to noise mitigation is to transmit data more than one time for each message transmission. Such multiple transmission may take the form of transmitting the message information a plurality of times (i.e., transmitting a message M, nM times), or transmitting the plurality of messages a plurality of times (i.e., transmitting a multiple message nM, m times; m(nM)). Such multiple transmission techniques are useful for simplex communication systems; that is in communication systems in which transmissions are only sent from a transmitting station to at least one receiving station. In such simplex communication systems, receiving stations have little or no capability to transmit return messages to the originating transmitting station. Return communication capability may, for example, be limited to an indication that a message, or a packet has been received. Typical such simplex systems include, for example, early paging systems. An important consideration in mitigating the effects of noise using a multiple transmission arrangement, one may most advantageously employ such techniques by ensuring that any periodicity of noise occurrence is less than or equal to one-half of the repeat period for multiple transmissions. A fundamental implementation of such multiple transmission techniques is to simply arrange for the transmitter to keep sending the message for a predetermined number of times or for a predetermined period of time. In such a fundamental system, the transmitter is not aware of any pattern of noise and does not adjust its operations to accommodate any noise pattern. In such simplex systems, a transmitting station does not know whether the intended receiver station is in fact correctly receiving the message being sent. Repeat transmission techniques in simplex communication systems amount to a brute force approach to solving the problem of electromagnetic interference adversely affecting message transmissions.

Another, slightly more sophisticated forward looking approach to noise mitigation is to include in the message traffic (usually as part of the overhead portion of the message) some redundancy. Hamming Codes and other error detection techniques that enable a receiving station to ascertain that an error has occurred in the received message are useful manifestations of this forward looking approach. Such redundancy-providing techniques do not enable a receiving station to reconstruct a received message (i.e., the redundancy does not enable error correction), but serve to alert a receiver that an error has occurred. Knowing that an error has occurred enables a receiver station to, for example, request retransmission of the portion of the message known to have been received containing an error.

A significant shortcoming of such simplex communication systems is the lack of knowledge regarding noise conditions affecting transmissions received by the receiving station. Such noise conditions include noise conditions in the vicinity of the receiving station, noise conditions en route from the transmitting station to the receiving station, and noise conditions in the vicinity of the transmitting station. Some knowledge of the noise conditions affecting a receiver station may, therefore, be gained by monitoring noise in the vicinity of the transmitting station. Monitoring ambient noise at the transmitting station, and adjusting transmission parameters to mitigate the effects of that ambient noise, provide at least a partial remedy to the noise affecting messages received by a receiving station. In a simplex communication system, with no information available from the receiving station regarding noise conditions extant at the receiving station, such ambient noise is the only noise information available.

It is important to keep in mind that reaction time of a communication system in responding to perceived noise is a function of detection time involved in the detection of the noise (including, for example, the detection or recognition of a pattern associated with the noise), and the correction time required to effect the desired corrective action in response to the perceived noise. Various transmitting parameters may be adjusted to mitigatingly accommodate detected noise. One adjustment technique is to interleave bits of message information (and perhaps overhead information) among a plurality of frames, or packets, over time. So long as the receiver station is cognizant of the interleaving arrangement being implemented by the transmitting station, reading the received information to correctly extract message information and overhead information may be accomplished. The theory is that noise is usually short-lived and, by spreading information over time in a recognizable interleaving pattern, noise may corrupt some parts of a message, but not all parts of a message. Continuing in that logical direction, if one combines an interleaving arrangement with including redundancy coding (e.g., Hamming Codes or Reed-Solomon Codes) then the likelihood of recovering the entirety of transmission is increased.

Such interleaving and redundancy handling of transmissions may be dynamically applied. That is, one may invoke such noise mitigating techniques when noise of a certain intensity is detected, and lesser mitigating techniques may be employed in relatively non-noisy periods. This is an important consideration because noise mitigation techniques of the sort discussed herein all take up transmitting capacity and, therefore, reduce the amount of data throughput that may be accomplished when noise mitigation efforts are in place. It is likely a design necessity that one must sacrifice throughput in order to enhance opportunity for recovery from the effects of noise in a communication system.

When a communication system is a duplex system; that is, when two-way communications are conducted between a transmitting station and a receiving station, one may employ feedback systems for mitigating the effects of electromagnetic interference, or noise. Such feed back systems enjoy the advantage of information provided by a receiving station to the transmitting station regarding noise conditions extant at the receiving station. Such information regarding extant noise conditions at a receiving station necessarily relates to noise sources in the vicinity of the transmitting station, noise, sources en route from the transmitting station to the receiving station, and nose sources in the vicinity of the receiving station. It is important to remember that information provided a receiving station to a transmitting station in a duplex communication system regarding noise conditions at a receiving station does not include noise conditions experienced by message traffic returning to the transmitting station from the receiving station. Designers of communication systems should ensure that such return communications are sufficiently robust that return transmissions are not susceptible to corruption. Usually, a robust communication channel is one that conveys information slowly, or repeats information often, or both sends slowly and repeats often. Typical feedback signals from a receiving station to a transmitting station include such information as receiver lock information, signal quality information, noise information, tracking information relating to adjusting a receiver clock to maintain receiver lock (this also is an indicator of noise), and administrative signals (such as a request for retransmission signal).

One feedback system for mitigating the effects of noise provides that a receiving station advise a transmitting station when noise reaches unacceptable levels. It is also useful if the receiving station advises the transmitting station when noise levels return to acceptable levels. By knowing such periodic excursions of noise levels, a properly configured transmitting station may substantially predict when noise levels will be unacceptable and adjust transmitting parameters appropriately during such anticipated noisy periods to mitigate the effects of the expected unacceptable noise levels. Advice by a receiving station relating periodicity of noise may be conveyed in the form of a compete history of noise levels for a period. Such information is useful so long as the historical period provided by the receiving station exceeds the periodicity of the noise. An alternative to providing a complete history of noise levels is to provide "time stamps" noting only excursion occurrences of noise. That is, a receiving station may provide information to a transmitting station notations of the times that noise exceeds a predetermined level, and also advises when noise returns to an acceptable level. Such a "time stamp" approach involves less information being transmitted, less impact on throughput, and yields substantially equally useful information as providing a complete history of noise levels for a given time period. Having ascertained noisy periods, a transmitting station may adjust transmit parameters appropriately to mitigate the effects of expected, or predicted noise. Such adjustments may, for example, include adjusting power level of transmission, adjusting packet repeat pattern, adjusting packet repeat rate, shifting transmit interval for repeat patterns or adjusting start/stop times for transmissions. Also, any of the forward systems discussed above in connection with simplex communication systems may be included in measures that may be taken by a transmitting station in anticipation of predicted unacceptable noise levels. Further, combinations of any of the individual measures may be employed.

Another feedback technique for mitigating the effects of noise is to provide that a receiving station advise a transmitting station when a message, or a portion of a message, is not received with integrity. Such an advisory communication may be made in the form of a request to retransmit. A transmitting station may retransmit the affected portion of the message to the receiving station in response to such an advisory communication.

Feedback techniques are most useful because information received and collected regarding noise conditions at a receiving station may be used to predict noise patterns at the receiving station. Other parameters may be collected from a receiving station to aid in predicting noise periodicity. Such parameters may include signal-to-noise ratio, bit error rate, signal strength, and other signal- or noise-related parameters. Such statistical information may be collected regarding each data block, or packet. Information collection may be made only regarding selected packets, or data blocks. Data blocks may be as small as one bit of data. This is especially useful in impulse radio communication systems in which one bit of data may involve as much as 100 individual radio pulses integrated over time. By collecting such periodic information, patterns of noise—timing and amplitude—may be detected. Thus, shape of a noise waveform need not be known in detail. What is important to ascertain is the pattern of noise in order to mitigate its effects upon a communication system.

Yet another technique useful for mitigating the effects of noise in a duplex communication system is to skip an occasional pulse train (i.e., string of successive packets) during a noisy period, or a predicted noisy period. Communication may be resynchronized at the end of a noisy period, or a transmit timing pulse may be transmitted during the noisy period to facilitate synchronization for reacquiring communications. Another alternative for resynchronization is to provide that the transmitting station and the receiving station each synchronize with a third location, such as a GPS satellite signal. In any event, reacquisition of a signal from a transmitting station requires a pattern to be perceived by the receiving station in the signal from the transmitting station. Such pattern recognition involves some amount of elapsed time. Time spent in reacquiring synchrony may be reduced by establishing coding with acquisition/header pulses interspersed within data.

Figure 9:
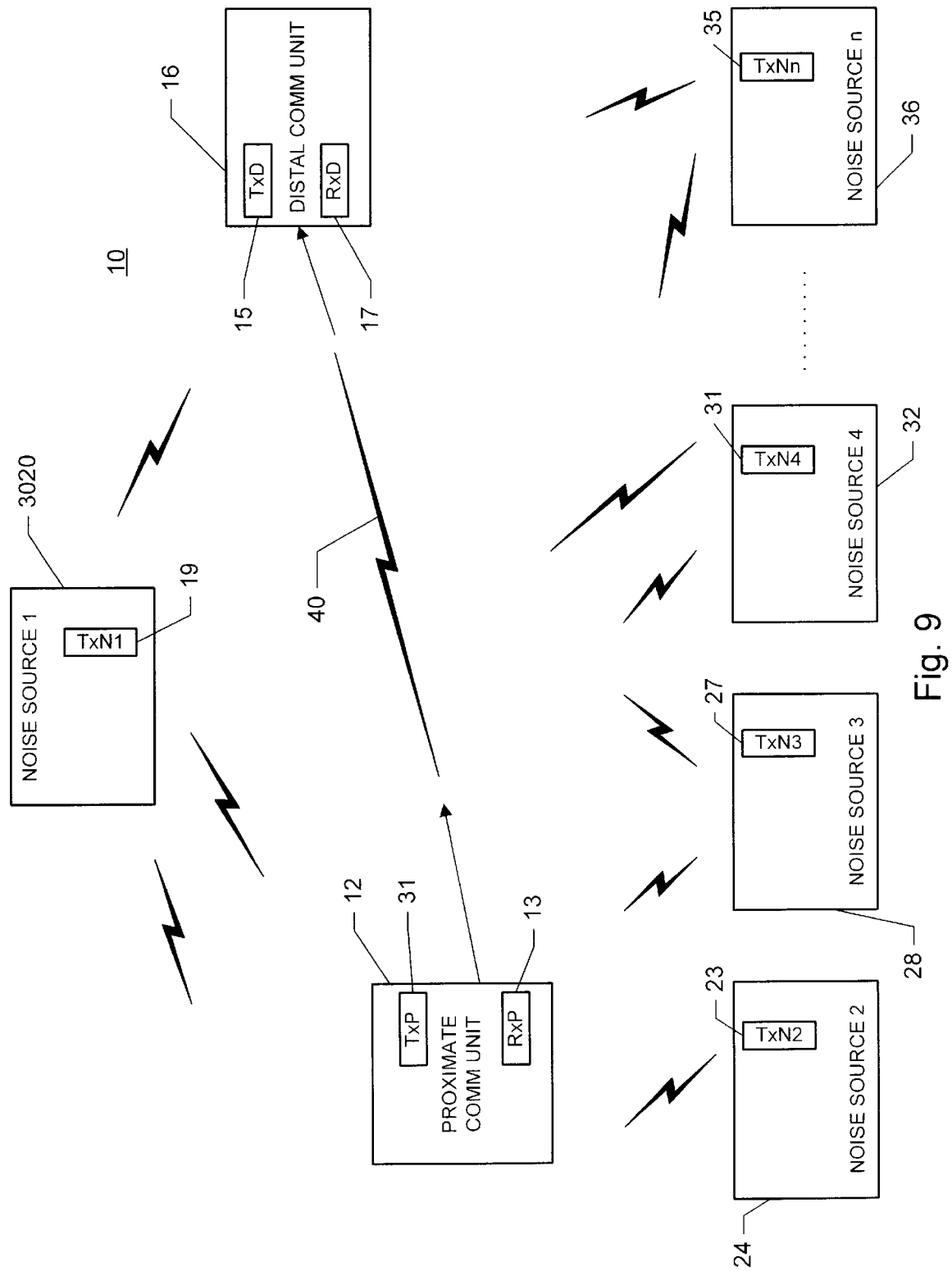
FIG. 9 illustrates an example of a noisy environment in an impulse radio communication system.

FIG. 9 illustrates an example of; a noisy environment in an impulse radio communication system. In FIG. 9, an impulse radio communication system 10 includes a proximate impulse radio communication unit 12 and a distal impulse radio communication unit 16. Impulse radio communication system 10 operates in an environment having a plurality of sources of electromagnetic interference, or noise, such as a first noise source 20 (noise source 1), a second noise source 24 (noise source 2), a third noise source 28 (noise source 3), a fourth noise source 32 (noise source 4), and other noise sources, represented by an nth noise source 36 (noise source n). Proximate communication unit 12 includes a proximate transmitter 11 (TxP) and a proximate receiver 13 (RxP). Distal communication unit 16 includes a distal transmitter 15 (TxD) and a distal receiver 17 (RxD). Noise source 20 includes a noise transmitter 19 (TxN1), noise source 24 includes a noise transmitter 23 (TxN2), noise source 28 includes a noise transmitter 27 (TxN3), noise source 32 includes a noise transmitter 31 (TxN4), and noise source 36 includes a noise transmitter 35 (TxNn).

In the representative impulse radio communication system 10 illustrated in FIG. 9, proximate communication unit 12 is communicatingly linked with distal communication unit 16 via a wireless communication link 40. Wireless communication link 40 is an impulse radio communication link with communication information arranged in any known format, including but not limited to continuous information and packet information. Proximate communication unit 12 may be connected with a plurality of distal communication units (not shown in FIG. 9). For simplicity in explaining the present invention, only one such communicating link 40 is illustrated in FIG. 9. Each noise source 20, 24, 28, 32, 36 may interfere with wireless communication link 40. Each noise source 20, 24, 28, 32, 36 may generate noise in a different frequency range, with a different pattern or duty cycle, and at a different signal strength.

Distal transmitter 15 is included in FIG. 9 as illustrative of a preferred embodiment of the present invention. In another embodiment of the present invention, distal communication units do not establish duplex communications with proximate communication unit 12, so that distal transmitter 15 is not present. In such an alternate configuration, only simplex communications are established between proximate communication unit 12 and distal communication unit 16. Thus, in the illustrative simplified embodiment of FIG. 9, when distal communication unit 16 is equipped with a distal transmitter 15, communications between proximate communication unit 12 and distal communication unit 16 are duplex communications. Using such a capability for duplex communications, distal communication unit 16 can indicate to proximate communication unit 12 the quality of received signal experienced. That is, distal communication unit 16 can directly indicate to proximate communication unit 12 via return communications from distal transmitter 15 to proximate receiver 13 the character of signals received by distal receiver 17, including information relating to noise being encountered by distal receiver 17.

In the alternate (simplex communication) embodiment of impulse radio communication system 10 without distal transmitter 15, proximate communication unit 12 measures noise in the environment with a proximate receiver 13. Thus, proximate receiver 13 may be configured to measure noise within a predetermined frequency band. Alternatively, proximate receiver 13 may be tunable to measure noise in a plurality of frequency bands, either simultaneously or seriatim. If proximate receiver 13 is capable of measuring noise in a plurality of frequency bands simultaneously, then proximate receiver 13 may be configured as a plurality of receivers. Preferably, proximate communication unit 12 is configured to evaluate noise signals measured by proximate receiver 13 to determine observed interference periods. Most preferably, proximate communication unit 12 is configured to evaluate noise signals measured by proximate receiver 13 to predict future interference periods. A prediction capability makes proximate communication unit 12 able to anticipate occurrence of an interference period in determining when to effect a preventive action for moderating the effect of noise in the environment, such as cessation of transmission of control signals, increasing power level of transmitted control signals, shortening packets of transmitted control signals arranged for packet communication, increasing the data rate for transmitting control signals, or other alterations, either singly or in an appropriate combination.

Figure 10:
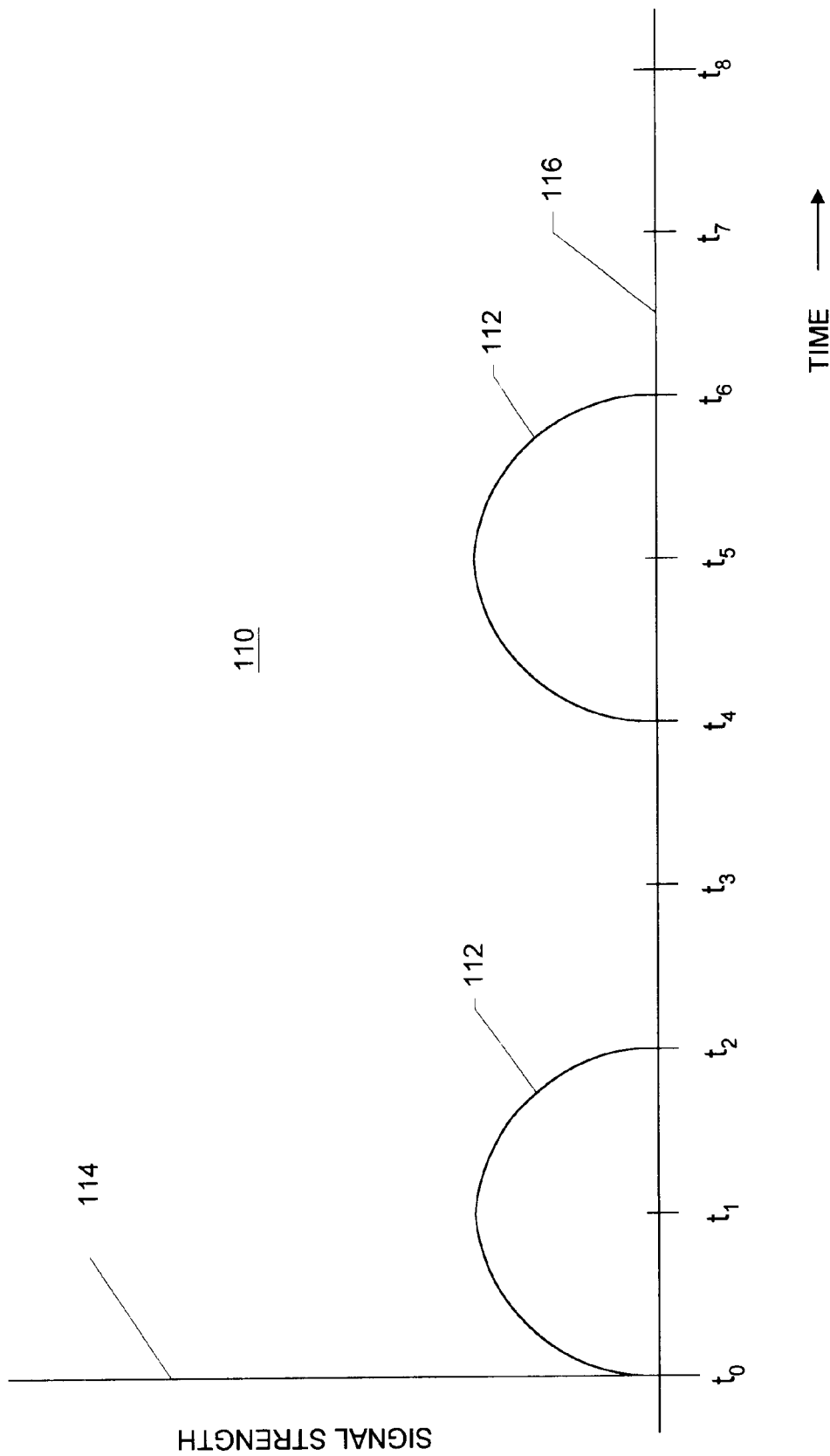
FIG. 10 is a schematic diagram illustrating the periodic generation of noise by a representative noise source.

FIG. 10 is a schematic diagram illustrating the periodic generation of noise by a representative noise source. In FIG. 10, a graph 110 illustrates a signal 112 representative of a leakage envelope related to operation of a source of electromagnetic noise, such as a household appliance, for example a microwave oven or a cellular telephone. Signal 112 is plotted on graph 110 indicating signal strength on a vertical axis 114, as a function of time on a horizontal axis 116. Signal 112 transmits intermittently in a pattern reflecting half-cycles of a 60 Hertz power supply signal provided to the appliance (not shown). Thus, the appliance generates noise in increasing amounts during a time period $t_0$–$t_1$ to a peak signal strength at time $t_1$. Signal 112 decreases in signal strength to a substantially zero value during a time period $t_1$–$t_2$. Signal 112 remains at a substantially zero signal strength during a time period $t_2$–$t_4$, and increases again to a peak signal strength during a time period $t_4$–$t_5$. Signal 112 again decreases in signal strength to a substantially zero signal strength during a time period $t_5$–$t_6$. If the appliance generating noise signal 112 remained in an ON state, signal 112 would resume at a time $t_8$. However, in graph 110, the appliance source of noise signal 112 was turned to an OFF state some time during the time period $t_6$–$t_8$, so noise signal 112 remains at a substantially zero signal strength after time $t_6$.

Thus, the representative appliance associated with FIG. 10 acts as a half-wave rectifier and transmits noise only during half of a 60 Hertz cycle. Accordingly, half the time is available for unrestricted transmission of message signals to a distal communication unit from a proximate communication unit, such as proximate communication unit 12 (FIG. 9). Noise from a plurality of noise sources in the environment may additively contribute with a result that noise-free periods are less than one-half of a 60 Hertz cycle. Moreover, turning appliances on and off, and other circumstances, may combine to produce a noise envelope that changes over time in frequency range, duty cycle (i.e., ON time versus OFF time), signal strength, and other factors. It is therefore desirable that a predictive capability be provided to an impulse radio communication unit configured according to the present invention. By measuring, or evaluating a plurality of frequency ranges in which noise signals may prove interfering to communication operations one can better mitigate effects of interference. Further, if one can predict the occurrence of noise signals above a threshold at which such noise becomes detrimental, one may anticipatorily effect change in a communication signal to better avoid, or otherwise mitigate the effects of interference. As mentioned earlier, such change in communication signal may, for example, involve one or more of cessation of the control signal, varying power level or data rate of the control signal, or altering the packet length of the control signal. Other mitigating actions are also available. Measuring and evaluating noise signals is preferably effected in a repeat cycle significantly shorter than the frequency of changes caused either by changes in operating (e.g., turning appliances on or off) or by changes from other causes, such as beat frequency effects among noise signals, or the like.

Shorter evaluation cycles facilitate more accurate prediction of change, more immediate recognition of actual change, and more accurate checking of accuracy of predictions. All such advantages facilitate more efficient adaptation of an appliance control system to its noise environment.

Figure 11:
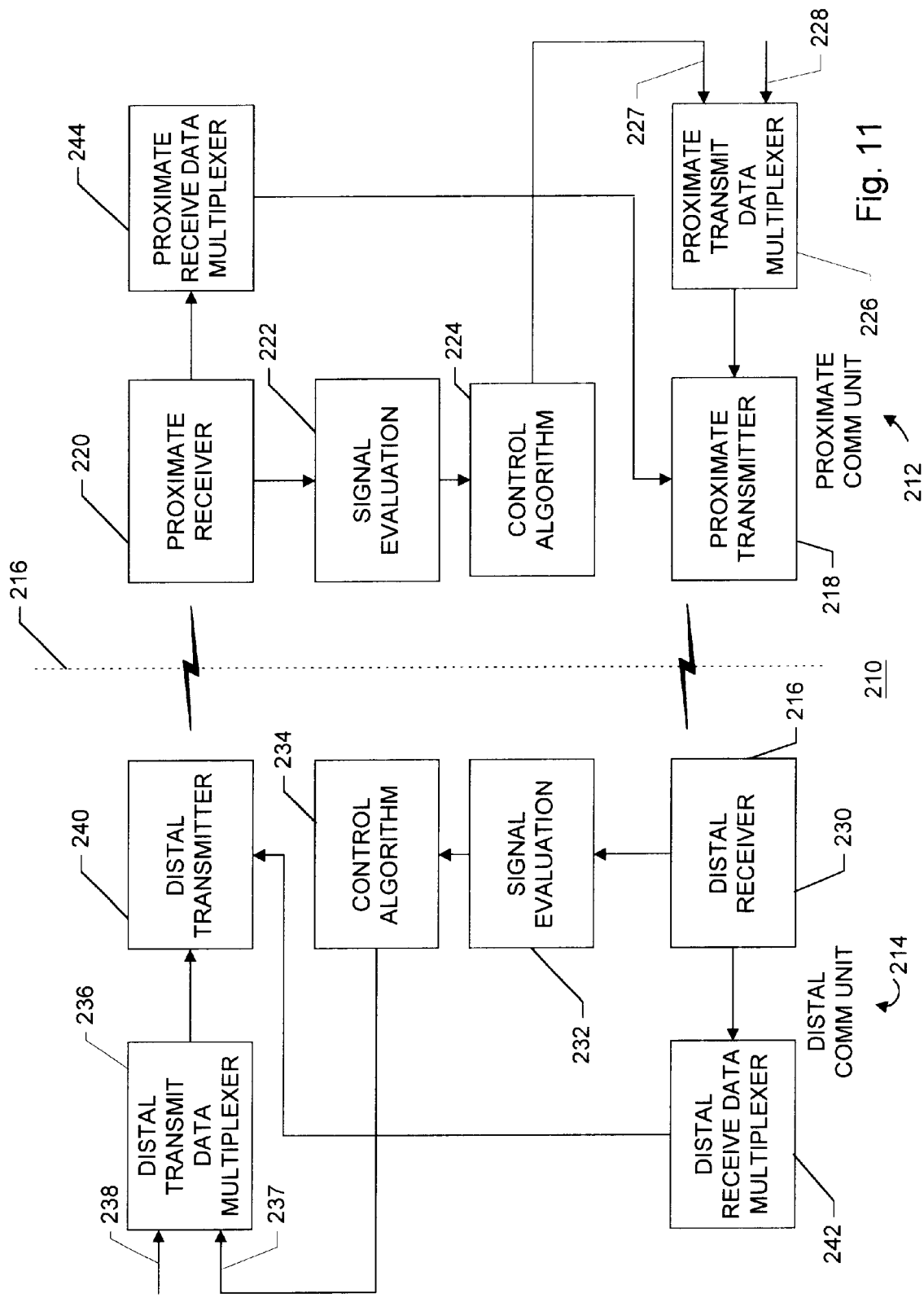
FIG. 11 is an exemplary diagram of one embodiment of an impulse radio communication system in a noisy environment according to the present invention.

FIG. 11 is an exemplary diagram of one embodiment of an impulse radio communication system in a noisy environment according to the present invention. In FIG. 11, an impulse radio communication system 210 includes an impulse radio proximate communication unit 212 and an impulse radio distal communication unit 214. Proximate communication unit 212 and distal communication unit 214 are communicatively linked wirelessly through a communication interface 216. Proximate communication unit 212 includes a proximate transmitter 218 for transmitting control signals via communication interface 216 to distal communication unit 214. Proximate communication unit 212 also includes a proximate receiver 220 for receiving signals. Proximate receiver 220 may be configured for receiving environmental noise signals (not shown in detail in FIG. 11), configured for receiving communication signals from distal communication unit 214, or configured to receive both environmental noise signals and communication signals from distal communication unit 214. Preferably proximate receiver 220 is configured to receive communication signals from distal communication unit 214 and is capable of measuring noise signals in at least one frequency range in which noise signals are disruptive to operation of communication system 210. Such measurement of noise signals in different frequency ranges may be effected substantially simultaneously or seriatim. Proximate receiver 220 provides at least a portion of its signal received relating to the quality of the signal received from a distal transmitter 240 of distal communication unit 214 for signal evaluation, as indicated by a signal evaluation block 222. In the preferred embodiment of impulse radio communication system 10 illustrated in FIG. 11, both proximate communication unit 212 and distal communication unit 214 have a transmitter and a receiver. In such a configuration, communication signals received by proximate receiver 220 from distal communication unit 214 contain signal strength information from distal communication unit 214 relating to the quality of signal received by a distal receiver 230 from a proximate transmitter 218. Proximate receiver 220 also receives noise interference information in the form of noise signals extant in the environment. Signal strength information is provided by proximate receiver 220 for signal evaluation 222 in order to evaluate the prospect of altering one or more operating parameters for proximate transmitter 218. Noise information is provided to a proximate receive data multiplexer 244 for use in determining whether to alter transmission by proximate transmitter 218 to moderate the effects of ambient noise.

Results of signal evaluation 222 which may have been effected by one or more of the signal evaluation techniques described earlier, such as signal strength, signal-to-noise ratio (SNR), or bit error rate (BER) evaluation are provided for evaluation according to a predetermined control algorithm, as indicated by a block 224. Results of evaluation by the predetermined control algorithm are provided to a proximate data multiplexer 226. Such results of evaluation indicate, for example, whether distal communication unit 214 should alter an operational parameter.

Proximate data multiplexer 226 receives the results of algorithmic evaluation (block 224) at a first input 227 to proximate data multiplexer 226. Proximate data multiplexer 226 receives data to be transmitted at a second input 228.

Such data for transmission includes message signals and overhead signals employed in operating communication system 210. A multiplexed signal including elements of results of control algorithm evaluation and elements of data to be transmitted are provided by proximate data multiplexer 226 to proximate transmitter 218 for transmission through communication interface 216 to distal communication unit 214. Preferably communication interface 216 is a wireless impulse radio control interface between proximate communication unit 212 and distal communication unit 214.

As mentioned briefly before, proximate receiver 220 provides noise interference information in the form of noise signals extant in the environment to proximate receive data multiplexer 244. Proximate receive data multiplexer 244 evaluates noise information received from proximate receiver 220 and indicates to proximate transmitter 218 whether to alter transmitted signals to distal communication unit 214. Such alterations may include cessation of transmission, altering data rate or power level, shortening packet length, or other alterations, alone or in appropriate combinations.

Distal communication unit 214 includes a distal receiver 230 for receiving communications from proximate transmitter 218. Distal receiver 230 sends information relating to quality of the signal received from proximate transmitter 218 for signal evaluation, as indicated by a block 232. Signal evaluation according to block 232 may be carried out according to any accepted signal evaluation criteria, including those criteria applied by proximate communication unit 212 in its signal evaluation 224. The evaluation of the criteria is effected employing a predetermined control algorithm, as indicated by a block 234. Results of the exercise of the control algorithm indicating aspects of signal propagation within communication system 210 are provided to a distal transmit data multiplexer 236 at a first input 237.

Distal receiver 230 provides noise interference information in the form of noise signals extant in the environment to a distal receive data multiplexer 242. Distal receive data multiplexer 242 evaluates noise information received from distal receiver 230 and indicates to distal transmitter 240 whether to alter transmitted signals to proximate communication unit 212. Such alterations may include cessation of transmission, altering data rate or power level, shortening packet length or other alterations, alone or in appropriate combination.

Figure 12:
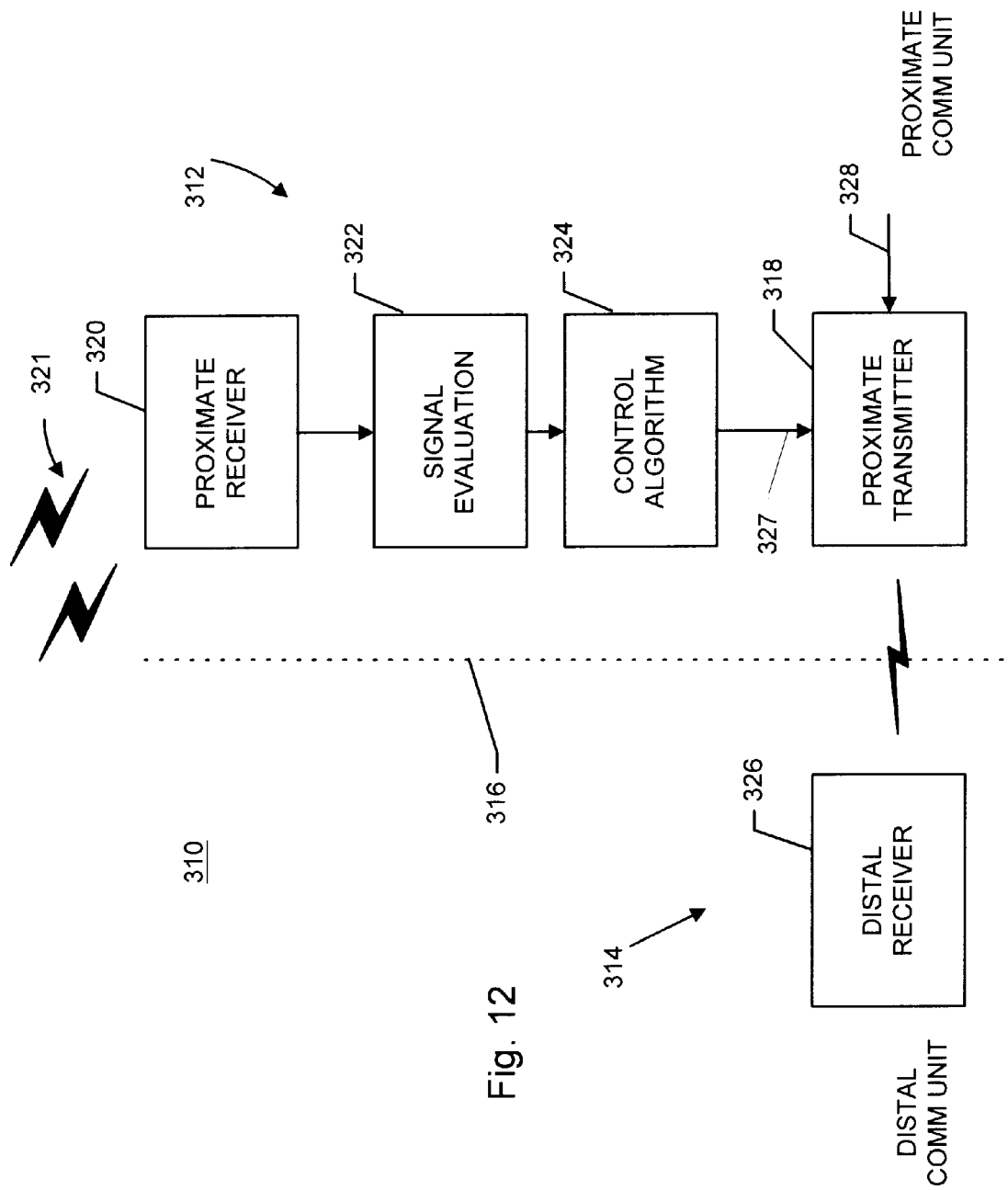
FIG. 12 is an exemplary diagram of an alternate embodiment of an impulse radio communication system employed in a noisy environment according to the present invention.

FIG. 12 is an exemplary diagram of an alternate embodiment of an impulse radio communication system employed in a noisy environment according to the present invention. In FIG. 12, an impulse radio communication system 310 includes a proximate communication unit 312 and a distal communication unit 314. Proximate communication unit 312 and distal communication unit 314 are communicatively linked wirelessly through a communication interface 316. Proximate communication unit 312 includes a proximate transmitter 318 for transmitting control signals via communication interface 316 to distal communication unit 314. Proximate transmitter 318 receives data signals, such as control signals for controlling transmission to distal communication unit 314, at an input 328. Proximate communication unit 312 also includes a proximate receiver 320 for receiving signals. Proximate receiver 320 is configured for receiving noise signals. There is no need to configure proximate receiver 320 to receive communication signals because, in the embodiment of communication system 310 illustrated in FIG. 12, simplex communications are only carried out from proximate communication unit 312 to distal communication unit 314.

Preferably proximate receiver 320 is capable of measuring noise signals in at least one frequency range in which noise signals are disruptive to operation of communication system 310. Such measurement of noise signals in different frequency ranges may be effected substantially simultaneously or seriatim. Proximate receiver 320 provides received noise signals 321 for noise signal evaluation, as indicated by a signal evaluation block 322. In the preferred embodiment of communication system 310, only proximate communication unit 312 has a proximate transmitter 318 and a proximate receiver 320. Distal communication unit 314 is equipped only with a distal receiver 324.

In such a configuration, signals received by proximate receiver 320 contain noise interference information relating to the environment in which communication system 310 operates. It is such noise signal information that is provided by proximate receiver 320 for signal evaluation 322. Results of signal evaluation 322 may have been effected, for example, by one or more of the signal evaluation techniques such as signal strength, signal-to-noise ratio (SNR), or bit error rate (BER) evaluation. Results of signal evaluation 322 are provided for evaluation according to a predetermined control algorithm, as indicated by a block 324. Results of evaluation by the predetermined control algorithm are provided to proximate transmitter 318 as a control input 327 to proximate transmitter 318. Such results of evaluation may indicate, for example, whether proximate transmitter 318 should alter its transmission signal by such measures as cessation of transmission, altering power level of transmission, altering data rate or shortening packet length, or by other measures.

Figure 13:
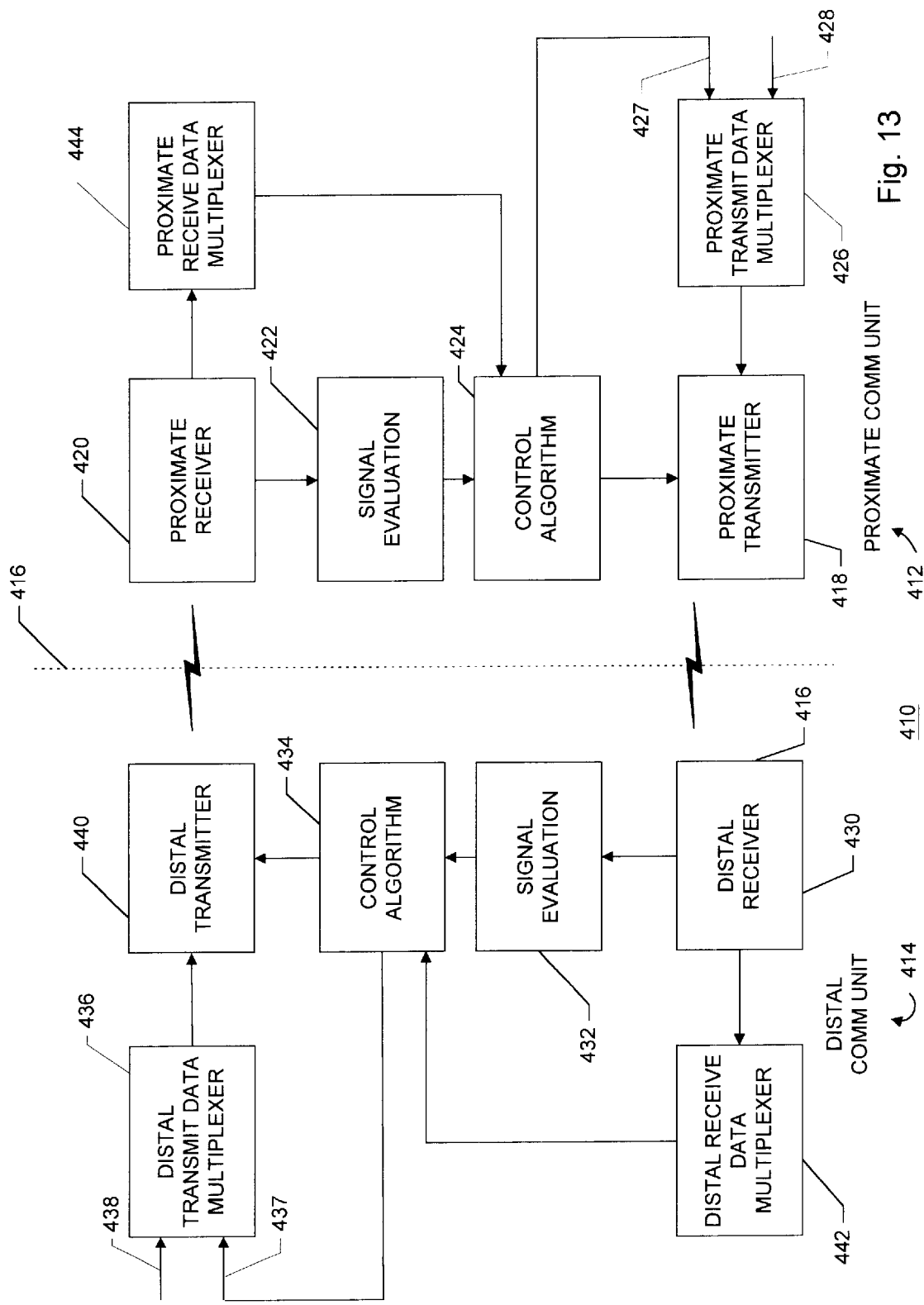
FIG. 13 is an exemplary diagram of a second alternate embodiment of an impulse radio communication system employed in a noisy environment according to the present invention.

FIG. 13 is an exemplary diagram of a second alternate embodiment of an impulse radio communication system employed in a noisy environment according to the present invention. In FIG. 13, an impulse radio communication system 410 capable of duplex communications between a proximate communication unit 412 and a distal communication unit 414 is illustrated. Components of communication system 410 are substantially the same as components of impulse radio communication system 210 (FIG. 11); connections among components differ between the two systems 210, 410. In the interest of avoiding prolixity, description of system 410 (FIG. 13) will concentrate on differences between systems 210, 410.

Thus, impulse radio communication system 410 includes proximate communication unit 412 and a distal communication unit 414 communicatively linked wirelessly through a communication interface 416. Proximate communication unit 412 includes a proximate transmitter 418, a proximate receiver 420, a proximate transmit data multiplexer 426, a proximate receive data multiplexer 444, and performs signal evaluation 422 using a control algorithm 424. Preferably proximate receiver 420 is configured to receive communication signals from distal communication unit 414 and is capable of measuring noise signals in at least one frequency range in which noise signals are disruptive to operation of communication system 410. Measurement of noise in various frequency ranges may be effected either substantially simultaneously or seriatim. Proximate receiver 420 provides signal information for signal evaluation, as indicated by a signal evaluation block 422. Results of signal evaluation 422 which may have been effected by one or more of the signal evaluation techniques, such as signal strength, signal-to-noise ratio, or bit error rate (BER) evaluation are provided for evaluation according to a predetermined control algorithm, as indicated by a block 424. Results of evaluation by the predetermined control algorithm are provided to a proximate transmit data multiplexer 426. Such results of evaluation may indicate, for example, whether distal communication unit 414 should alter its transmission signal from a distal transmitter 440 to improve signal reception by proximate receiver 420.

Proximate transmit data multiplexer 426 receives the results of algorithmic evaluation (block 424) at an input 427, and receives data, such as communication signals, to be transmitted at an input 428. A multiplexed signal including elements of results of control algorithm evaluation and elements of data to be transmitted are provided by proximate transmit data multiplexer 426 to proximate transmitter 418 for transmission through communication interface 416 to distal communication unit 414. Preferably communication interface 416 is a wireless impulse radio control interface between proximate communication unit 412 and distal communication unit 414.

Proximate receiver 420 also provides noise interference information in the form of noise signals extant in the environment to a proximate receive data multiplexer 444. Proximate receive data multiplexer 444 evaluates noise information received from proximate receiver 420 and provides resultant information for inclusion in control algorithm evaluation 424. Results of control algorithm evaluation 424 are applied to proximate transmitter 418 to determine whether to alter transmitted signals to distal communication unit 414. Such alterations may include cessation of transmission, altering data rate or power level, shortening packet length, or other alterations, alone or in appropriate combinations. The provision of information by proximate receive data multiplexer 444 for inclusion in control algorithm evaluation 424, and the direct control connection between control algorithm evaluation 424 and proximate transmitter 418 are one difference between systems 410, 210 (FIG. 11).

A similar difference between systems 410, 210 is incorporated in distal communication unit 414 of system 410. That is, distal communication unit 414 includes a distal receiver 430, a distal transmitter 440, a distal transmit data multiplexer 436, a distal receive data multiplexer 442, performs signal evaluation 432 and exercises a control algorithm 434. Distal receiver 430 provides noise interference information to distal receive data multiplexer 442. The noise information is preferably representative of noise signals extant in the environment. Distal receive data multiplexer 442 evaluates noise information received from distal receiver 430 and provides resultant information for inclusion in control algorithm evaluation 434. Results of control algorithm evaluation 434 are applied to distal transmitter 440 to determine whether to alter transmitted signals to proximate communication unit 412. Such alterations may include cessation of transmission, altering data rate or power level, shortening packet length, or other alterations, alone or in appropriate combinations. The provision of information by distal receive data multiplexer 442 for inclusion in control algorithm evaluation 434, and the direct control connection between control algorithm evaluation 434 and distal transmitter 440 are another difference between systems 410, 210 (FIG. 11).

Figure 14:
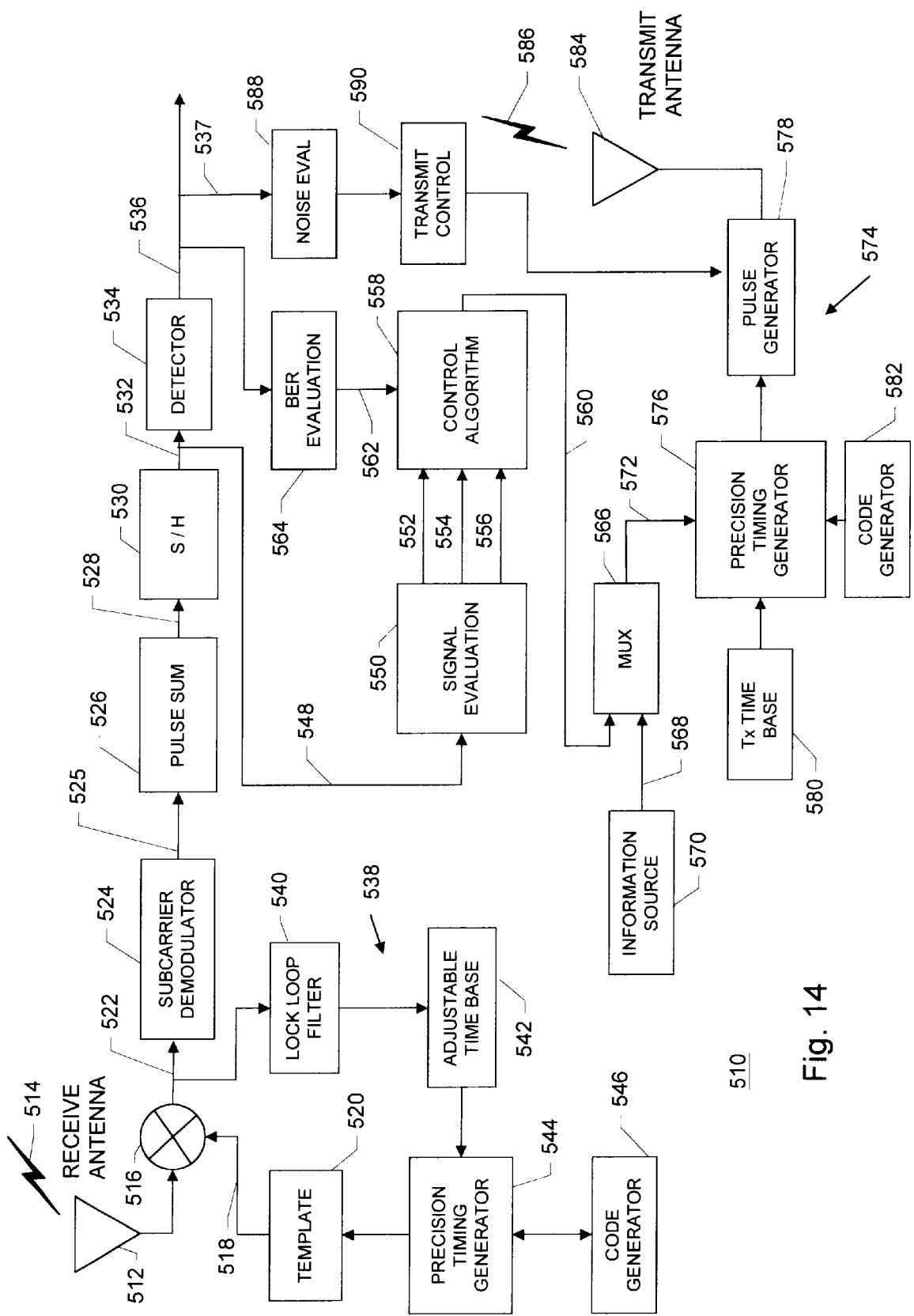
FIG. 14 is an exemplary diagram of an impulse radio apparatus including noise measuring functions employed in communication according to the preferred embodiment of the present invention.

FIG. 14 is an exemplary diagram of an impulse radio apparatus including noise measuring functions employed in communication according to the preferred embodiment of the present invention. In FIG. 14, a communication transceiver 510 for use in an impulse radio communication system and configured to measure signal strength, signal-to-noise ratio (SNR), and bit error rate (BER) is illustrated. Communication transceiver 510 is appropriate for use in communication systems 10 (FIG. 9), 210 (FIG. 11), 310 (FIG. 12), and 410 (FIG. 13).

In communication transceiver 510, a receive antenna 512 receives incoming signals 514. Incoming signals 514 may contain information relating to quality of signal received by a distal communication unit. Incoming signals 514 may include indications of effects of noise experienced by the distal communication unit (e.g., as in duplex communication capable systems), or may simply be noise signals present in the system environment (e.g., in simplex communication capable systems). Received signal 514 is provided to a correlator 516. Correlator 516 multiplies received signal 514 according to a template signal 518 received from a template generator 520 to produce a correlated signal which is short term integrated (or alternatively sampled) by correlator 516 to produce a baseband output signal 522. Baseband output signal 522 is provided to an optional subcarrier demodulator 524. Subcarrier demodulator 524 demodulates any subcarrier signal that may be involved with incoming signal 514 to produce a subcarrier demodulated baseband signal 525.

Subcarrier demodulated baseband signal 525 is then long term integrated in a pulse summation stage 526. Pulse summation stage 526 is typically an integrate-and-dump stage that produces a ramp shape output waveform when transceiver 510 is receiving incoming signal 514. Pulse summation stage 526 preferably produces a random walk type waveform when receiving pure noise at receive antenna 512. Pulse summation stage 526 provides an output signal 528 to a sample-and-hold stage 530. An output signal 532 from sample-and-hold stage 530 is provided to a detector 534. Detector 534 produces an output in the form of a detection-indicating signal 536; detection-indicating signal 536 indicates, the logic state of received signal 514. Baseband output signal 522 from correlator 516 is also provided to a lock loop 538. Lock loop 538 includes a lock loop filter 540, an adjustable time base 542, a precision timing generator 544, template generator 520 and correlator 516. Lock loop 538 maintains a stable quiescent operating point on the correlation function performed by correlator 516 in the presence of variations in the transmitter time base frequency and variations due to Doppler effects.

Adjustable time base 542 drives precision timing generator 544, which provides timing to a code generator 546. Code generator 546 provides timing commands back to timing generator 544 according to a selected code. Timing generator 544 provides timing signals to template generator 520 according to the timing commands, and template generator 520 generates a proper template waveform 518 for use by correlator 516 for the correlation process. Coding is optional. Accordingly, it should be appreciated that the present invention covers non-coded implementations that do not incorporate code generator 546.

Output signal 528 from pulse summation stage 526 is sampled by the sample-and-hold stage 530 providing an output signal 548 to a signal evaluation stage 550. Signal evaluation stage 550 evaluates output signal 548 to determine a measure of the signal strength 552, received noise 554, and signal-to-noise ratio (SNR) 556. These values are employed by a transmit control algorithm 558 to generate a transmit control update signal 560. Transmit control update signal 560 is determined according to one or more of several measurements: signal strength 552, received noise 554, SNR 556, timing and predictions of noise, and other parameters. Transmit control algorithm 558 may also employ a bit error rate (BER) measurement 562 in determining power control update signal 560. BER measurement 562 provided by a BER evaluation function 564 that samples detection indicating signal 536.

Transmit control update signal 560 is provided to a multiplexer 566. Multiplexer 566 also receives an information signal 568 from an information source 570. Multiplexer 566 combines transmit control update signal 560 with information signal 568 in a multiplexed output signal 572. Multiplexed output signal 572 is provided to a transmitter 574. Transmitter 574 includes a precision timing generator 576, a pulse generator 578, a transmitter time base 580, a code generator 582 and a transmit antenna 584. A portion of multiplexed output signal 572 contains user data (i.e., information signal 568) and a portion contains control information, which includes transmit control update signal 560. Multiplexed output signal 572 is provided to transmitter precision timing generator 576 (which may optionally include a subcarrier modulation process). Transmitter precision timing generator 576 is driven by transmitter time base 580 and interfaces with code generator 582. Code generator 582 provides pulse position commands according to a PN code to effect impulse radio signals. Timing generator 576 provides timing signals to pulse generator 578; pulse generator 578 generates pulses of proper amplitude and waveform according to the timing signals received from pulse generator 578. These pulses are then transmitted by transmit antenna 584 as transmitted impulse radio signals 586.

BER 562 is a measure of signal quality that is related to the ratio of error bits to the total number of bits transmitted in incoming signals 514, as indicated by detection indicating signal 536. The use of other signal quality measurements, which are apparent to one skilled in the relevant art, are within the spirit and scope of the present invention.

Detection indicating signal 536 may contain both user data and noise avoidance control components. Noise avoidance control command components 537 may be selected from detection indicating signal 536 by a noise evaluation unit 588. When noise evaluation unit 588 determines that noise is interfering, or will likely soon interfere, with operation of system 510, a notification is provided to a transmit control unit 590. Transmit control unit 590 controls transmitter 574 to avoid, overcome or otherwise mitigate the effects of noise by methods previously discussed, including cessation of transmission, altering power level of transmission, altering data rate or shortening packet length.

While various embodiments of the present invention have been described above, it should be understood that they have been presented by way of example, and not limitation. For instance, although the exemplary system embodiment in this patent application is an impulse radio using a 2.0 GHz center frequency, impulse radio systems with a center frequency from below audio to microwave, millimeter wave, teraHertz, and even optical frequencies may benefit from this invention. In addition, some of the embodiments may be of benefit to spread spectrum radio systems in general (that is, spread spectrum radio systems that do not employ impulse radio communications). Further, the transmission wave may be electromagnetic or acoustic. The breadth and scope of the present invention should not be limited by any of the above-described exemplary embodiments, but should be defined only in accordance with the following claims and their equivalents.

We claim:

1. A method for mitigating adverse effects of interference in impulse radio communication; said impulse radio communication conveying a transmission message from a transmitting station to a receiving station displaced from said transmitting station; said transmission message including at least one of an information payload and overhead information; the method comprising the steps of:

(a) determining an expected occurrence period for said interference based upon at least one of a noise measurement by said transmitting station and a noise measurement by said receiving station;

(b) conveying said transmission message in a plurality of transmission packets; and (c) repeating conveyance of selected packets of said plurality of packets; said conveying and said repeat conveying making up a repeat transmission package; at least a portion of said conveyance or said repeating conveyance being effected outside said expected occurrence period.

2. A method for mitigating adverse effects of interference in impulse radio communication as recited in claim 1 wherein the method comprises the further steps of:

(d) conveying said repeat transmission package a plurality of times at a repeat conveyance period greater than twice said expected occurrence period.

3. A method for mitigating adverse effects of interference in impulse radio communication; said impulse radio communication conveying a transmission message from a transmitting station to a receiving station displaced from said transmitting station; said transmission message including at least one of an information payload and overhead information; the method comprising the steps of:

(a) determining an expected occurrence period for said interference based upon at least one of a noise measurement by said transmitting station and a noise measurement by said receiving station;

(b) conveying said transmission message; and (c) repeating conveyance of said transmission message; at least a portion of said conveyance or said repeating conveyance being effected outside said expected occurrence period.

4. A method for mitigating adverse effects of interference in impulse radio communication as recited in claim 1, 2 or 3 wherein said transmission message is composed to include error correction coding.

5. A method for mitigating adverse effects of interference in impulse radio communication as recited in claim 3 wherein said repeating conveyance of said transmission message is carried out a plurality of times.

6. A method for mitigating adverse effects of interference in impulse radio communication as recited in claim 5 wherein said repeating conveyance is carried out at a repeat conveyance period greater than twice said expected occurrence period.

7. A method for mitigating adverse effects of interference in impulse radio communication; said impulse radio communication conveying a transmission message from a transmitting station to a receiving station displaced from said transmitting station; said transmission message including at least one of an information payload and overhead information; the method comprising the steps of:

(a) determining an expected occurrence period for said interference based upon at least one of a noise measurement by said transmitting station and a noise measurement by said receiving station;

(b) composing said transmission message to include error correction coding within said overhead information; and (c) conveying said transmission message; at least a portion of said conveying being effected outside said expected occurrence period.

8. A method for mitigating adverse effects of interference in impulse radio communication; said impulse radio communication conveying a transmission message from a transmitting station to a receiving station displaced from said transmitting station; said transmission message including at least one of an information payload and overhead information; said information payload being arranged in a plurality of payload packets; said overhead information being arranged in a plurality of overhead packets; said transmission message being arranged in a plurality of transmission packets; the method comprising the steps of:

(a) determining an expected occurrence period for said interference based upon at least one of a noise measurement by said transmitting station and a noise measurement by said receiving station;

(b) interleavingly arranging selected payload packets of said plurality of payload packets and selected overhead packets of said plurality of overhead packets among a selected transmission packet group of said plurality of transmission packets to compose said transmission message as a stream of a plurality of said transmission packet groups populated by said interleaving; and (c) conveying said transmission message; at least a portion of said conveying being effected outside said expected occurrence period.

9. A method for mitigating adverse effects of interference in impulse radio communication as recited in claim 8 wherein the method comprises the further steps of:

(d) repeating said conveying of said transmission message a plurality of times.

10. A method for mitigating adverse effects of interference in impulse radio communication as recited in claim 9 wherein said repeating conveying of said transmission message is effected at a repeat conveyance period greater than twice said expected occurrence period.

11. A method for mitigating adverse effects of interference in impulse radio communication as recited in claim 1, 2, 3, 5, 6, 7, 8, 9 or 10 wherein the method comprises the further steps of:

(a) monitoring ambient interference of said interference proximate said transmitting station;

(b) determining patterns of noise in said ambient interference to determine predicted low noise periods; and (a) effecting selected conveyances during selected of said predicted low noise periods; said selected conveyances including said conveying said transmission message, said conveying a repeat transmission package, and said repeat conveyance of said transmission message.

12. A method for mitigating adverse effects of interference in impulse radio communication as recited in claim 1, 2, 3, 5, 6, 7, 8, 9 or 10 wherein the method comprises the further steps of:

(a) monitoring ambient interference of said interference proximate said transmitting station;

(b) determining patterns of noise in said ambient interference to determine predicted low noise periods; and (c) reducing said overhead information as a portion of said transmission message during selected of said predicted low noise periods.

13. A method for mitigating adverse effects of interference in impulse radio communication as recited in claim 12 wherein said reducing said overhead information is effected by varying at least one of said error correction coding and said interleaving.

14. A method for mitigating adverse effects of interference in impulse radio communication; said impulse radio communication including conveying a transmission message from a proximate transmitter to a distal receiver, and including receiving a reception message by a proximate receiver from a distal transmitter; said transmission message and said reception message each including at least one of an information payload and overhead information; the method comprising the steps of:

(a) providing receiver-interference indications by said distal receiver to said proximate transmitter regarding interference conditions at said distal receiver; and (b) operating said proximate transmitter to convey said transmission message; said operating said proximate transmitter being effected according to at least one of the following criteria:

(1) avoiding conveying said transmission message when said receiver-interference is present in an interference strength greater than a first predetermined interference strength;

(2) effecting said conveying said transmission message at a higher conveying power when said receiver-interference is present in an interference strength greater than a second predetermined interference strength; and (3) varying error detection coding in said transmission message when said receiver-interference is present in an interference strength interference strength greater than a third predetermined interference strength.

15. A method for mitigating adverse effects of interference in impulse radio communication as recited in claim 14 wherein said at least one criteria further includes:

(4) retransmitting at least a portion of said transmission message after said receiver-interference has been present in an interference strength greater than a fourth predetermined interference strength and has subsided to an interference strength less than a fifth predetermined interference strength.

16. A method for mitigating adverse effects of interference in impulse radio communication as recited in claim 14 wherein the method comprises the further step of:

(c) providing error rate indications by said distal receiver to said proximate transmitter regarding error conditions at said distal receiver; and wherein said at least one criteria further includes:

(4) retransmitting at least a portion of said transmission message after said error rate indication has been present at an error rate level greater than a first predetermined error rate level and has subsided to an error rate level less than a second predetermined error rate level.

17. A method for mitigating adverse effects of interference in impulse radio communication as recited in claim 14 or 15 wherein at least one of said proximate transmitter and said distal receiver determines a predicted interference at said distal receiver, and wherein said interference strength of said receiver-interference employed in applying said criteria is said predicted interference.

18. A method for mitigating adverse effects of interference in impulse radio communication as recited in claim 15 or 16 wherein a decision whether to effect said retransmitting at least a portion of said transmission message is determined by said proximate transmitter.

19. A method for mitigating adverse effects of interference in impulse radio communication as recited in claim 15 or 16 wherein a decision whether to effect said retransmitting at least a portion of said transmission message is determined by said distal receiver.

20. A method for mitigating adverse effects of interference in impulse radio communication as recited in claim 15 or 16 wherein a decision whether to effect said retransmitting at least a portion of said transmission message is determined by said proximate transmitter and said distal receiver.

21. A method for mitigating adverse effects of interference in impulse radio communication; said impulse radio communication including conveying a transmission message from a proximate transmitter to a distal receiver, and including receiving a reception message by a proximate receiver from a distal transmitter; said transmission message and said reception message each including at least one of an information payload and overhead information; the method comprising the steps of:
   (a) providing receiver-interference indications by said distal receiver to said proximate transmitter regarding interference conditions at said distal receiver; said receiver-interference indications including time indicators generally denoting interference events; said interference events including a degeneration time when said interference conditions begin to unacceptably degrade said impulse radio communication, and including a regeneration time when said interference conditions return from unacceptably degrading said impulse radio communication to less than unacceptably interfering with said impulse radio communication;
   (b) mathematically processing said receiver-interference indications to determine predicted noise periods; said predicted noise periods being time periods during which said interference conditions are predicted to unacceptably degrade said impulse radio communication; and
   (c) operating said proximate transmitter to convey said transmission message; said operating said proximate transmitter being effected according to at least one of the following criteria:
      (1) avoiding conveying said transmission message during said predicted noise periods;
      (2) effecting said conveying said transmission message at a higher conveying power during said predicted noise periods;
      (3) varying error detection, coding in said transmission message during said predicted noise periods;
      (4) retransmitting at least a portion of said transmission message during periods following said predicted noise periods; and
      (5) effecting said conveying said transmission message at a lower data rate during said predicted noise periods.

22. A method for mitigating adverse effects of interference in impulse radio communication as recited in claim 21 wherein said at least one criteria further includes:
   (6) avoiding conveying said transmission message when said receiver interference is present inn an interference strength greater than a first predetermined interference strength;
   (7) effecting said conveying said transmission message at a higher conveying power when said receiver-interference is present in an interference strength greater than a second predetermined interference strength; and
   (8) varying error detection coding in said transmission message when said receiver-interference is present in an interference strength interference strength greater than a third predetermined interference strength.

23. A method for mitigating adverse effects of interference in impulse radio communication as recited in claim 21 or 22 wherein said at least one criteria further includes:
   (9) retransmitting at least a portion of said transmission message after said receiver-interference has been present in an interference strength greater than a fourth predetermined interference strength and has subsided to an interference strength less than a fifth predetermined interference strength.

24. A method for mitigating adverse effects of interference in impulse radio communication as recited in claim 21 or 22 wherein the method comprises the further step of:
   (d) providing error rate indications by said distal receiver to said proximate transmitter regarding error conditions at said distal receiver; said error rate indications including error time indicators generally denoting error events; said error events including an error degeneration time when said error conditions begin to unacceptably degrade said impulse radio communication, and including an error regeneration time when said error conditions return from unacceptably degrading said impulse radio communication to less than unacceptably degrading with said impulse radio communication; and
   wherein said at least one criteria further includes:
      (9) retransmitting at least a portion of said transmission message after said error rate indication has been present at an error rate level greater than a first predetermined error rate level and has subsided to an error rate level less than a second predetermined error rate level.

25. A method for mitigating adverse effects of interference in impulse radio communication as recited in claim 21 or 22 wherein said receiver-interference indications further include notification by said distal receiver to said proximate transmitter to reconvey said transmission message.

26. A method for mitigating adverse effects of interference in impulse radio communication as recited in claims 21 or 22 wherein said at least one criteria further includes:
   (8) conveying said transmission message in a plurality of packets in a packet repeat pattern having a packet repeat rate; adjusting at least one of [a] size of packets in said plurality of packets, [b] said packet repeat pattern and [c] said packet repeat rate to substantially avoid said predicted noise periods; and
   (9) ceasing conveying said transmission message during selected noise periods of said predicted noise periods and transmitting a timing signal during said selected noise periods; and synchronizing said transmission message with said timing signal for continuing conveying said transmission message after said selected noise periods; and
   (10) ceasing conveying said transmission message during selected noise periods of said predicted noise periods; said proximate transmitter and said distal receiver each receiving a synchronizing timing signal from a third timing source during said selected noise periods; and synchronizing said transmission message with said timing signal for continuing conveying said transmission message after said selected noise periods.

27. A method for mitigating adverse effects of interference in impulse radio communication as recited in claims 21 or 22 wherein said receiver-interference indications further include providing signal characteristic information by said distal receiver to said proximate transmitter.

28. A method for mitigating adverse effects of interference in impulse radio communication as recited in claim 27 wherein said signal characteristic information includes bit error rate information.

29. A method for mitigating adverse effects of interference in impulse radio communication as recited in claim 27 wherein said signal characteristic information includes signal-to-noise ratio information.

30. A method for mitigating adverse effects of interference in impulse radio communication as recited in claim 27 wherein said signal characteristic information includes signal strength information.

31. A method for mitigating adverse effects of interference in impulse radio communication; said impulse radio communication including conveying a transmission message from a proximate transmitter to a distal receiver using, and including receiving a reception message by a proximate receiver from a distal transmitter; said transmission message and said reception message each including at least one of an information payload and overhead information; the method comprising the steps of:

(a) providing receiver-interference indications by said distal receiver to said proximate transmitter regarding interference conditions intermediate said proximate transmitter and said distal receiver; said receiver-interference indications including a history of said interference conditions for a plurality of sample intervals taken at a sample frequency;

(b) mathematically processing said receiver-interference indications to determine predicted noise periods; said predicted noise periods being time periods during which said interference conditions are predicted to unacceptably degrade said impulse radio communication; and (c) operating said proximate transmitter to convey said transmission message; said operating said proximate transmitter being effected according to at least one of the following criteria:

(1) avoiding conveying said transmission message during said predicted noise periods;

(2) effecting said conveying said transmission message at a higher conveying power during said predicted noise periods;

(3) varying error detection coding in said transmission message during said predicted noise periods; and (4) retransmitting at least a portion of said transmission message during said predicted noise periods during periods following said predicted noise periods.

32. A method for mitigating adverse effects of interference in impulse radio communication as recited in claim 31 wherein said sample frequency is adjusted to substantially avoid said predicted noise periods.

33. A method for mitigating adverse effects of interference in impulse radio communication as recited in claim 31 wherein said conveying said transmission message from said proximate transmitter to said distal receiver is effected using a first pulse repetition rate during said predicted noise periods, and wherein said conveying said transmission message from said proximate transmitter to said distal receiver is effected using a second pulse repetition rate during other than said predicted noise periods; said first pulse repetition rate being lower than said second pulse repetition rate.

* * * * *